(12) United States Patent
Gislason

(10) Patent No.: US 8,983,919 B2
(45) Date of Patent: *Mar. 17, 2015

(54) SYSTEMS AND METHODS FOR IMPROVING DATABASE PERFORMANCE

(71) Applicant: Teldurá ð gevin Sp/f, Faroe Islands (DK)

(72) Inventor: Eyjólfur Gislason, Tórshavn (DK)

(73) Assignee: Teldurá ð gevin Sp/f (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/170,252

(22) Filed: Jan. 31, 2014

(65) Prior Publication Data

US 2014/0229424 A1  Aug. 14, 2014

Related U.S. Application Data

(63) Continuation of application No. 13/315,863, filed on Dec. 9, 2011, now Pat. No. 8,676,772.

(51) Int. Cl.
*G06F 17/30* (2006.01)

(52) U.S. Cl.
CPC .... *G06F 17/30563* (2013.01); *G06F 17/30339* (2013.01)
USPC .......................................... 707/696

(58) Field of Classification Search
None
See application file for complete search history.

(56) References Cited

U.S. PATENT DOCUMENTS

| | | |
|---|---|---|
| 5,675,785 A | 10/1997 | Hall et al. |
| 6,665,682 B1 | 12/2003 | DeKimpe et al. |
| 6,748,393 B1 | 6/2004 | Kapoor et al. |
| 7,139,783 B2 | 11/2006 | Hinshaw et al. |
| 7,461,077 B1 | 12/2008 | Greenwood et al. |
| 7,711,573 B1 | 5/2010 | Obeid |
| 7,814,045 B2 | 10/2010 | Hermann et al. |
| 7,822,712 B1 | 10/2010 | Robinson et al. |

(Continued)

FOREIGN PATENT DOCUMENTS

| | | |
|---|---|---|
| EP | 0706140 B1 | 7/1999 |
| EP | 1522032 B1 | 7/2007 |

(Continued)

OTHER PUBLICATIONS

"U.S. Appl. No. 13/315,863, PTO Response to 312 Communication mailed Feb. 9, 2014", 1 pg.

(Continued)

*Primary Examiner* — Sherief Badawi
*Assistant Examiner* — Courtney Harmon
(74) *Attorney, Agent, or Firm* — Schwegman Lundberg & Woessner, P.A.

(57) ABSTRACT

Systems and methods for mapping and propagating a source dataset to a plurality of target tables in a target database are described herein. Embodiments include a physical database design with a template-based loader, and a method to propagate changes in the source dataset to a target database. Other embodiments include a database physical design with a plurality of small fact and summary tables. Still other embodiments include a method of extracting and loading data automatically into a target database, while simultaneously maintaining current summary tables.

14 Claims, 21 Drawing Sheets

(56) References Cited

U.S. PATENT DOCUMENTS

| | | | |
|---|---|---|---|
| 7,949,687 B1 | 5/2011 | Sinclair | |
| 8,676,772 B2 | 3/2014 | Gislason | |
| 2005/0010564 A1 | 1/2005 | Metzger et al. | |
| 2005/0108204 A1 | 5/2005 | Gordon | |
| 2005/0240562 A1* | 10/2005 | Steinmann et al. | 707/1 |
| 2006/0212432 A1* | 9/2006 | Tsai | 707/3 |
| 2008/0133455 A1 | 6/2008 | Giordano | |
| 2011/0022816 A1 | 1/2011 | Swett et al. | |
| 2013/0124453 A1* | 5/2013 | Bhide et al. | 707/602 |
| 2013/0151491 A1 | 6/2013 | Gislason | |

FOREIGN PATENT DOCUMENTS

| | | |
|---|---|---|
| EP | 1131744 B1 | 3/2010 |
| WO | WO-2013083793 A1 | 6/2013 |

OTHER PUBLICATIONS

"U.S. Appl. No. 13/315,863, PTO Response to Rule 312 Communication mailed Feb. 25, 2014", 2 pgs.

"U.S. Appl. No. 13/315,863, Response filed May 7, 2013 to Final Office Action mailed Feb. 7, 2013", 19 pgs.

"U.S. Appl. No. 13/315,863, Response filed Dec. 3, 2012 to Non Final Office Action mailed Oct. 12, 2012", 14 pgs.

"U.S. Appl. No. 13/315,863, Examiner Interview Summary mailed Oct. 18, 2013", 4 pgs.

"U.S. Appl. No. 13/315,863, Examiner Interview Summary mailed Oct. 28, 2013", 3 pgs.

"U.S. Appl. No. 13/315,863, Final Office Action mailed Feb. 7, 2013", 35 pgs.

"U.S. Appl. No. 13/315,863, Non Final Office Action mailed Jul. 8, 2013", 45 pgs.

"U.S. Appl. No. 13/315,863, Non Final Office Action mailed Oct. 12, 2012", 28 pgs.

"U.S. Appl. No. 13/315,863, Notice of Allowance mailed Nov. 22, 2013", 26 pgs.

"U.S. Appl. No. 13/315,863, Response filed Oct. 8, 2013 to Non Final Office Action mailed Jul. 8, 2013", 17 pgs.

"International Application Serial No. PCT/EP2012/0704823, International Search Report mailed Mar. 6, 2013", 3 pgs.

"International Application Serial No. PCT/EP2012/0704823, Written Opinion mailed Mar. 6, 2013", 7 pgs.

Zhuge, Yue, et al., "View Maintenance in a Warehousing Environment", Technical Report, Stanford University [available via anonymous ftp host db.stanford.edu as pub/zhuge/1994/anomaly-full.ps], (Oct. 1994), 12 pgs.

\* cited by examiner

```perl
1  # Example data extraction script
2  # Written in the Perl programming language
3  # connect to the source database
4  # establish a database handler in $dbh
5  do 'connect_to_db.pl';
6  # Get command line arguments year and month
7  my ($year,$month) = @ARGV;
8  #Check that command line arguments are valid
9  if ( !($year >1950 and $year < 2900) ) {
10   die "Missing or wrong year:$year";
11 }
12 if ( ! ($month>0 and $month < 13) ) {
13   die "Missing or wrong month:$month";
14 }
15 my $extraction_stage_dir="stage/extraction_files";
16 # Form file name using naming convention:tx_yyyy_mm
17 my $extractfilename=sprintf("tx_%04d_%02d",$year,$month);
18 my $extraction_sql= qq(
19   select store_id,
20          product_group_id,
21          product_id,
22          promotion_id,
23          tx_year,
24          tx_month,
25          tx_dayom,
26          amount
27   from tx_lines
28   where tx_year = $year
29     and tx_month = $month);
30 # Pass sql to database and execute sql
31 my $sth =$dbh->prepare($extraction_sql) or die $sql;
32 $sth->execute() or die;
33 # Open data extraction file
34 open(my $data_extraction_file, ">",
35      "$extraction_stage_dir/$extractfilename") or die;
36 #Fetch result set and write to data extraction file
37 while ((@row)=$sth->fetchrow_array) {
38   y{\r\n}{  } for @row; # remove cr/nl
39   s{\|}{}sg for @row;   # remove separator character
40   # Write out 1 record pr line separated by |
41   print $data_extraction_file join("|",@row),"|\n";
42 }
43 close($data_extraction_file);
```

*FIG. 4*

```
tx_lines
                                                                              500
STORE_ID PRODUCT_GROUP_ID PRODUCT_ID PROMOTION_ID TX_YEAR TX_MONTH TX_DAYOM AMOUNT
-------- ---------------- ---------- ------------ ------- -------- -------- ------
    1           1              1           1        2010     11       15      15
    1           1              2           2        2010     11       28      28
    2           2              3           2        2010     12        7      15
    1           2              4           2        2010     12        7      56
    1           1              1           3        2010     12       22      87
    1           1              2           3        2011      1        5      21
    2           1              3           3        2011      1       10      34
    2           1              4           3        2011      1       15      44
    2           1              3           3        2011      1       25      13
```

FIG. 5

```
                                                600
perl extract_tx_lines.pl 2010 11
perl extract_tx_lines.pl 2010 12
perl extract_tx_lines.pl 2011 1
```

FIG. 6

```
                                          700
Filename: tx_2010_11
1|1|1|1|2010|11|15|15|
1|1|2|2|2010|11|28|28|

702
Filename: tx_2010_12
2|2|3|2|2010|12|7|15|
1|2|4|2|2010|12|7|56|
1|1|1|3|2010|12|22|87|

704
Filename: tx_2011_01
1|1|1|3|2011|1|5|21|
1|1|2|3|2011|1|10|34|
2|1|3|3|2011|1|15|44|
2|1|4|3|2011|1|25|13|
```

FIG. 7 splitter configuration file: splitter_config_tx.pl

```
$config{splitting_schemes} = "templates/splitting_schemes_tx.lst";
$config{extraction_files} = "stage/extraction_files/tx*";
$config{filename_pattern} = qr/^tx_\d\d\d\d_\d\d\d$/;
```

800 — $config{splitting_schemes}
802 — $config{extraction_files}
804 — $config{filename_pattern}

*FIG. 8* splitting schemes file: templates/splitting_schemes_tx.lst

```
data_extract_file="stage/extraction_files/tx_2010_11";
while ((getline < data_extract_file )==1) {
  fn="stage/SPLIT/tx_2010_11_1/tx_2010_11_"""s"$1"_pg"$2
  if (fn!=tt) {
     close (tt)
  }
  print $0 >> fn
  tt=fn
}
close(data_extract_file);
data_extract_file="stage/extraction_files/tx_2010_11";
while ((getline < data_extract_file )==1) {
  fn="stage/SPLIT/tx_2010_11_2/tx_2010_11_"""d"$7
  if (fn!=tt) {
     close (tt)
  }
print $0 >> fn
tt=fn
}
close(data_extract_file);
data_extract_file="stage/extraction_files/tx_2010_11";
while ((getline < data_extract_file )==1) {
  fn="stage/SPLIT/tx_2010_11_3/tx_2010_11_"""pr"$3
  if (fn!=tt) {
     close (tt)
  }
  print $0 >> fn
  tt=fn
}
close(data_extract_file);

(not shown)

data_extract_file="stage/extraction_files/tx_2011_01";
while ((getline < data_extract_file )==1) {
  fn="stage/SPLIT/tx_2011_01_3/tx_2011_01_"""pr"$3
  if (fn!=tt) {
     close (tt)
  }
  print $0 >> fn
  tt=fn
}
close(data_extract_file);
```

```
File: tx_2010_12_d7

2|2|3|2|2010|12|7|15|
1|2|4|2|2010|12|7|56|

File: tx_2011_01_s1_pg1

1|1|1|3|2011|1|5|21|
1|1|2|3|2011|1|10|34|

File: tx_2011_01_s2_pg1

2|1|3|3|2011|1|15|44|
2|1|4|3|2011|1|25|13|
``` loader program

```
1  mv stage/propagate/* stage/loadfiles/
2  ./template_expand.pl /home/stage/loadfiles | ./sql_tool.shl
3  mv /home/stage/loadfiles/* stage/loadfile_archive/
```

*FIG. 14*

Example matching rules for the loader program

```
@match_rules = (
1500    { regex    => qr/^tx_...._.._s\d+_pg\d+$/   ,
          template => 'templates/tx.tmpl'           },
1502    { regex    => qr/^tx_...._.._d\d+$/         ,
          template => 'templates/tx.tmpl'           },
1504    { regex    => qr/^tx_...._.._pr\d+$/        ,
          template => 'templates/tx_pr.tmpl'        }
);
```

*FIG. 15*

```perl
#!/usr/bin/perl
use File::Basename;
$source_dir=$ARGV[0] ||'diff';
$file_pat=$ARGV[1] ||'all';

print "# Template expander \n# Template instantiation using:\n";
print "# source dir:$source_dir file_pat:$file_pat\n";
our @match_rules;
my $template_config = "./template_config.pl";
do $template_config if -f $template_config;
die "142- No template configuration-file found " if ! -f $template_config;
die if ! @match_rules;
print "# Source dir:$source_dir:\n# file pattern:$file_pat:\n";
my $loadfile_list;
open ($loadfile_list,"find $source_dir -type f |");
$dir_pat=qr/(propagate|warehouse_archive|loadfiles)$/;
@suffixlist=(".db");

FILE_LOOP:
while ($fn=<$loadfile_list>) {
    chomp($fn);
    my ($file,$path,$suffix) = fileparse($fn,(@suffixlist));
    chop($path);
    if($file_patt ne 'all') {
        if( $file !~ m/$file_patt/ ) {
            next;
        } else {
            print "# Processing loadfile:$fn \n";
        }
    }
    if( $path =~ m/$dir_pat/) {
        $table=$file;
        MATCH_RULE:
        for my $rule (@match_rules) {
            print "# Error: 129-Missing rule element" if !$rule->{regex} or !$rule->{template};
            if( $file =~ m/$rule->{regex}/) {
                print "# 128-Error: No template file $rule->{template}\n" if ! -f $rule->{template};
                expand_template($rule->{template},$table,$fn);
                last MATCH_RULE;
            }
        }
    } else {
        print "# 1237-No dir match $path \n";
    }
}
exit;
```

*FIG. 16*

```perl
sub template {
  my ($templ_file)=@_;
  local $/=undef; # The input record separator, newline by default
  return "" if !-f $templ_file;
  open(my $tf,"<",$templ_file) || die "unable to open template file:$templ_file";
  my $template=<$tf>;
  close($tf);
  return $template;
} sub expand_template {
  my ($templ_file,$table,$fn) =@_;
  my ($tmp_table_name,$real_table_name);
  my $load_script=template($templ_file);
  my @swap_script= split(/\n/,$load_script);
  my $tmp_table=$table.'z';
  $load_script=~ s/drop +table +(\S*#TABLE#)/drop table if exists $1/g;
  $load_script=~ s/#TABLE#/$tmp_table/g;
  $load_script=~ s/#FILE#/$fn/g;
  print "# Using load/summary template: $templ_file \n";
  print qq(# constucting temporary names by appending "z" to #TABLE# tag\n);
  print $load_script,"\n";
  $swap_script="";
  foreach (grep(/drop\s+table/,@swap_script)) {
    if (($table_name)=m/drop +table +(\S*#TABLE#\w*)/) {
      $tmp_table_name=$real_table_name=$table_name;
      $tmp_table_name=~ s/#TABLE#/$tmp_table/;
      $real_table_name=~ s/#TABLE#/$table/;
      # Now make the swap and rename the load tables into real tables
      $swap_script.=qq(drop table if exists $real_table_name;\n);
      if ($table_name =~ /load$/) {
        $swap_script.=qq(# Skipped for load table\n);
      } else {
        $swap_script.=qq(alter table $tmp_table_name rename $real_table_name;\n);
      }
    } else {
      print $_," 123-No match\n";
      die;
    }
  }
  print qq(# Rename tables from "z" names to target names :\n);
  print $swap_script;
}
```

*FIG. 17*

Example template file: templates/tx.tmpl

```
drop table #TABLE#;

create table #TABLE# (
   store_id              integer,
   product_group_id      integer,
   product_id            integer,
   promotion_id          integer,
   tx_year               integer,
   tx_month              integer,
   tx_dayom              integer,
   amount                real
);

load data infile '#FILE#'
into table #TABLE#
fields terminated by '|' (
   store_id,
   product_group_id,
   product_id,
   promotion_id,
   tx_year,
   tx_month,
   tx_dayom,
   amount
);
```

*FIG. 18*

Example of instantiated template generated by the command:
template_expand.pl /home/stage/loadfiles tx_2011_01_s1_pg1

```
drop table if exists tx_2011_01_s1_pg1z;   ~1904 create table tx_2011_01_s1_pg1z (
  store_id               integer,
  product_group_id       integer,
  product_id             integer,
  promotion_id           integer,
  tx_year                integer,
  tx_month               integer,
  tx_dayom               integer,
  amount                 real
);

load data infile '/home/stage/loadfiles/tx_2011_01_s1_pg1'
into table tx_2011_01_s1_pg1z
fields terminated by '|' (
  store_id,
  product_group_id,
  product_id,
  promotion_id,
  tx_year,
  tx_month,
  tx_dayom,
  amount
);                                         ~1902

# Rename tables from "z" names to target names
drop table if exists tx_2011_01_s1_pg1;
alter table tx_2011_01_s1_pg1z rename tx_2011_01_s1_pg1;
```

*FIG. 19*

Example template with one summary table included

```
# Template for the promotion scheme
drop table #TABLE#;
create table #TABLE# (
   store_id            integer,
   product_group_id    integer,
   product_id          integer,
   promotion_id        integer,
   tx_year             integer,
   tx_month            integer,
   tx_dayom            integer,
   amount              real
);

load data infile '#FILE#'
into table #TABLE#
fields terminated by '|' (
   store_id, product_group_id, product_id, promotion_id,
   tx_year, tx_month, tx_dayom, amount);

# Create aggregation by eliminating tx_dayom column
drop table #TABLE#_no_dayom;
create table #TABLE#_no_dayom (
   store_id            integer,
   product_group_id    integer,
   product_id          integer,
   promotion_id        integer,
   tx_year             integer,
   tx_month            integer,
   amount              real
);

insert into #TABLE#_no_dayom
select store_id, product_group_id, product_id, promotion_id,
       tx_year, tx_month, sum(amount)
from #TABLE#
group by store_id, product_group_id, product_id,
promotion_id, tx_year, tx_month;
```

Expansion of the template using the commnad: /—2100
template_expand.pl /home/staging tx_2010_12_pr1

```
drop table if exists tx_2010_12_pr1z;
create table tx_2010_12_pr1z (
  store_id              integer,
  product_group_id      integer,
  product_id            integer,
  promotion_id          integer,
  tx_year               integer,
  tx_month              integer,
  tx_dayom              integer,
  amount                real
);
load data infile '/home/staging/tx_2010_12_pr1'
into table tx_2010_12_pr1z
fields terminated by '|' (
  store_id, product_group_id, product_id, promotion_id,
  tx_year, tx_month, tx_dayom, Amount
);

# Create aggregation by eliminating tx_dayom column
drop table if exists tx_2010_12_pr1z_no_dayom;
create table tx_2010_12_pr1z_no_dayom (
  store_id              integer,
  product_group_id      integer,
  product_id            integer,
  promotion_id          integer,
  tx_year               integer,
  tx_month              integer,
  amount                real
);
insert into tx_2010_12_pr1z_no_dayom
select store_id, product_group_id, product_id, promotion_id,
       tx_year, tx_month, sum(amount)
from tx_2010_12_pr1z
group by store_id, product_group_id, product_id, promotion_id,
       tx_year, tx_month;
                                                              /—2102
drop table if exists tx_2010_12_pr1;
alter table tx_2010_12_pr1z rename tx_2010_12_pr1;
drop table if exists tx_2010_12_pr1_no_dayom;
alter table tx_2010_12_pr1z_no_dayom rename tx_2010_12_pr1_no_dayom;
```

*FIG. 21*

```
(1)   create table TX (
   store_id             integer,
   product_group_id     integer,
   product_id           integer,
   promotion_id         integer,
   tx_year              integer,
   tx_month             integer,
   tx_dayom             integer,
   amount               real
) enable storage using splitting schemes;

(2)   alter table TX add splitting scheme
part_by_month 'tx_'|| to_char(tx_year) || '_' || to_char(tx_month);
(3)   alter table TX add splitting scheme split_scheme_900
part_by_month || '_' || 's' || store_id || '_pg' ||
product_group_id;
(4)   alter table TX add splitting scheme split_scheme_902
part_by_month || '_' || 'd' || tx_dayom;
(5)   alter table TX add splitting scheme split_scheme_904
part_by_month || '_' || 'pr' || product_id;

(6)   create or replace summary template summary_2000 on table TX
for split_scheme_904 as
begin template
create table #TABLE#_no_dayom (
   store_id             integer,
   product_group_id     integer,
   product_id           integer,
   promotion_id         integer,
   tx_year              integer,
   tx_month             integer,
   amount               real
);
insert into #TABLE#_no_dayom
select store_id, product_group_id, product_id, promotion_id,
tx_year, tx_month, sum(amount)
from #TABLE#
group by store_id, product_group_id, product_id, promotion_id,
tx_year, tx_month;
end template
(7)   load data infile 'filename' into table TX;
(8)   insert into TX select * from tx_lines where tx_year=2010 and
tx_month=12;
```

*FIG. 22*

```
Example syntax for creating a partitioned table:

create table tx_lines (
    store_id            integer,
    product_group_id    integer,
    product_id          integer,
    promotion_id        integer,
    tx_year             integer,
    tx_month            integer,
    tx_dayom            integer,
    amount              real)
partiton by expression 'tx_s'||store_id||'pg_'||product_group_id;

Another example:
create table tx_lines (
    store_id            integer,
    product_group_id    integer,
    product_id          integer,
    promotion_id        integer,
    tx_year             integer,
    tx_month            integer,
    tx_dayom            integer,
    amount              real)
dynamic partition on store_id , product_group_id name partitons
using 'tx_s'||store_id ||'pg_'||product_group_id;
```

*FIG. 23*

SYSTEMS AND METHODS FOR IMPROVING DATABASE PERFORMANCE

CROSS REFERENCE TO RELATED APPLICATIONS

This application is a continuation of and claims the benefit of priority to U.S. patent application Ser. No. 13/315,863, filed Dec. 9, 2011, which application is incorporated herein by reference and made a part hereof in its entirety, and the benefit of priority of which is claimed herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2011, Eyjólfur Gíslason.

TECHNICAL FIELD

This application is generally related to database technologies and more particularly related to systems and methods for improving database performance.

BACKGROUND

In the context of database technologies, databases may be characterized as data warehouses or operational databases. A data warehouse may be designed as a database to store large amounts of data from one or more operational systems. The operational systems may each be supported by one or more operational databases. Operational databases are commonly designed using normalized entity-relationship modeling. When designing an operational database, the database designer may seek to model the business domain in a manner to support the business applications and avoid recording redundant data as much as possible. The third-normal form is often strived for in such design. In general, normalized database schemas are tuned to support fast updates and inserts by minimizing the number of rows that must be changed when recording new data.

Data warehouses differ from operational databases in the way they are designed and used. Data warehouses are designed to be efficient for querying. Data warehouses usually provide a simplified version of the data in the operational databases. Instead of being updated by end users, updates to a data warehouse are propagated from operational systems.

One logical design technique used when designing a data warehouse is dimensional modeling. Schemas produced with dimensional modeling are known as star schemas. Star schemas include fact tables at the center of the star and dimension tables around the fact tables. Fact tables may be large tables and contain basis-level detailed data. Dimension tables contain attributes related to foreign keys in the fact tables.

A basis-level fact table tends to grow large and consequently the performance of queries against such a large basis-level fact table tends to suffer. The problem worsens as more data is stored in the basis-level fact table. One technique to alleviate or mitigate this problem is to provide summary-level fact tables where data from the basis-level fact table is aggregated. Although adding summary-level fact tables increase query performance, adding summary-level fact tables also adds to the complexity of the data warehouse. Users may be overwhelmed when faced with the task of choosing the correct table against which to direct their query. Because of this, users may be inclined to choose a fact table with every column needed and repetitively use this table for all the different queries. This option requires more system resources and provides lower overall performance.

Some attempts have been made to isolate the complexity of multiple summary tables from users by implementing a query rewrite facility in between the end user and the database that takes a user query and modifies it in order to generate a more efficient SQL statement. Query rewrite facilities, however, raise new issues of their own. For example, in order to implement a query rewrite facility, one approach is to add a layer of virtual tables, which are exposed to the user. This approach adds to the administrative burden of setting up the data warehouse and coordinating changes between the virtual table layer and the physical table layer.

Another approach to isolate the complexity of multiple summary tables from users is to utilize query rewrite and materialized view facilities at the database level. This approach has various limitations. First, it relies on the cleverness of a relational database management system (RDBMS) optimizer. Second, such facilities may only work for some SQL statements. Further, performance may depend on the cleverness of the SQL writer in order to fully utilize the RDBMS query optimizer. The database administrator may also have to create and maintain the required materialized views. In addition, query performance may be unpredictable as the same query is sometimes rewritten and other times not—depending on a complicated set of rules. The query rewrite approach is transparent to the users and database application; this can be a good thing, but for a professional software engineer it can also be seen as an opaque and unpredictable layer impeding the software engineer. Still another problem with the materialized-view/query rewrite approach is that the performance of materialized refresh operations may easily become too slow for practical use.

Another problem with summary tables is the reliability of data, in particular, ensuring that the summary tables are up-to-date and consistent with the basis-level fact table.

Another technique to improve performance in a data warehouse is to partition fact tables using partitioning options. Because fact tables commonly contain time-related transactions, partitioning on a time dimension is commonly used. For example, a fact table of retail sales may be partitioned by month. This may improve performance of queries that could utilize this partitioning. However, the problem with this is that in order to realize performance improvements, the query optimizer needs to be smart enough to know when partition elimination can be employed and only visit partitions that are relevant to the query. In practice, this partition elimination tends to work only in certain special cases. In other cases, the query optimizer may fall back to an execution plan that visits all available partitions, and the query performance suffers accordingly. This is especially likely to happen when the end user is not a database expert who understands the particular quirks of a SQL query optimizer. In such cases, the advantages gained from the partitioning may be limited to ease of manageability for the database administrator, with very little performance benefit for the end users.

For data warehouses with one or more large fact tables there are a number of issues with loading data and keeping both fact and summary data current and consistent with the source systems. Techniques for refreshing data in a data warehouse include a full refresh, an incremental record-by-record refresh, and an incremental partition-by-partition refresh. The technique employed may vary from table to table.

Using a full refresh technique for large fact tables can place a high burden on the operational system while extracting data and on the data warehouse when loading data. After a full refresh of a fact table, indexes need to be rebuilt, which adds time and computer resources to this task. Full refresh techniques may be limited to smaller fact tables.

The incremental record-by-record refresh technique may be faster, but also has issues. For example, in order to decide which records need to be added, this technique sometimes relies on a timestamp column in a source table in order to decide if a row is "new" in relation to the last time the refresh operation was executed. Uncommitted changes in the source table may be permanently omitted because a record-creation-timestamp value is not visible for other sessions until it is committed, and in particular, not visible for a session that is replicating data. A new record could be committed in the source table where the new record includes a record-creation-timestamp value prior to the replication-check-timestamp value. On subsequent execution of incremental replication this record is not selected because the replication-check-timestamp value is later then the record-created-timestamp value. This record is thus wrongfully omitted from all subsequent refresh cycles. This causes such incremental record-by-record algorithms to miss records from time to time and thus over time more and more propagation errors are accumulated, which causes divergence between the source and target database to develop. Another problem with an incremental record-by-record refresh is that it does not perform well when the table has many indexes, especially if the fact table is indexed with bitmap indexes. Yet another problem with an incremental record-by-record refresh is that handling updates and deletes to source rows is cumbersome to propagate correctly to the data warehouse.

Data in a data warehouse should correctly reflect the data in the operational systems with as little delay as possible. However, given the above-mentioned problems, this is often not attained in current systems. The present disclosure addresses these and other problems.

SUMMARY

Organizations register large amounts of information during their daily operation. Information is registered in order to keep track of various activities of operations. For example, when a sale is made, data describing the sale is registered in a database table. Data registered in relation to a sale may include the date and time of the sale, along with a range of foreign key identifiers identifying a store, a product, a product group, a promotion, and a geographic region. Such data may be stored in a relational database management system. Similarly, other activities such as inventory management, accounting, and purchasing may be supported by registrations in database tables for inventory transactions, accounting transactions, and purchasing transactions. Some organizations may use enterprise resource planning (ERP) applications. ERP systems typically store data and transactions in a relational database management system.

The data in relational databases is usually optimized for transactional processing, which means that the data is arranged in many different tables in such a way as to minimize redundant data. Often a normalized database design is employed where different tables register different aspects of the data, and the different tables are related to each other using primary and foreign keys that allow different tables to be joined when the need arises to relate different tables together to respond to a query.

Contemporary relational database management systems, together with ERP and other systems, work well for some operations. However, organizations that perform a large amount of queries may experience problems. For example, queries against a relational database management system work very well in some cases, but in other cases, query performance may be slow. Large tables or complex queries may cause slow query performance. Additionally, query performance may be impacted by inefficient physical data distribution on the storage media with respect to the set of records matched by a query.

To address one of the causes for slow query performance, large tables may be partitioned. Partitioning creates table partitions based on a range or a list of values. Each partition is populated with data based on one or more values in the record. The database administrator may choose how to partition a table. Partitioning is usually employed on very large or fast-growing tables. These large tables tend to be transaction tables and often partitioning on a date field is used. Thus, in many cases, partitioning is performed on some sort of date or time related column. Partitions are commonly managed by a database administrator, which adds administrative overhead to the use of partitioning.

Prior art partitioning techniques include list and composite partitioning, in addition to hash partitioning. List and composite partitioning supports a list of explicitly specified and named partitions. Hash partitioning supports a fixed number of partitions.

Thus, one object of the present disclosure is to provide dynamic partitions and rules for generating such partitions. In various embodiments, the present disclosure introduces dynamic partitions and rules for generating such partitions, which advantageously allow the declaration of many future partitions to be automatically created according to a partitioning scheme. Embodiments of the present disclosure provide convenient and flexible ways of specifying partitions using expressions where a single splitting scheme may be used to declare a rule to create and name partitions automatically. Some embodiments include multi-dimensional partitioning: partitions that are based on more than one data dimension from a source dataset. Some embodiments include dynamic expression-based multi-dimensional partitioning of a table in a relational database. Such embodiments may advantageously allow for simple specification of dynamic partitioning in a relational database.

In various embodiments of the present disclosure, large source-tables may be physically stored in many target tables. The size of the target tables is kept small by use of partitioning and automatic generation of even smaller summary tables. In the context of various embodiments, partitions are physically implemented as ordinary tables in the target database. It is, however, conceivable and within the scope of the disclosure that other embodiments could utilize other means, such as segments or partitions.

Another object of the present disclosure is to provide flexible configurability of partitioning. In various embodiments, the database developer may configure suitable choices for data mapping, splitting schemes, and load/summary templates to create a separate set of summary tables for corresponding basis fact tables. In various embodiments of the present disclosure, source data is partitioned into relatively small basis fact tables, resulting in relatively small summary tables based directly or indirectly on the fact tables. The methods the developer may employ when selecting partitioning schemes and summary tables may vary from developer to developer depending on skills, experience, understanding of the dataset, the type of queries to be served, and other issues involved. These partitioning schemes and summary table creation and management mechanisms may be automated. Further, as discussed in more detail below, multiple partitioning schemes may be implemented for the same source dataset. In addition, the resulting partitions may be systematically named.

In a data warehouse, a fact table may have a surrogate key representing the date dimension, and be partitioned on the date surrogate key. Consider the situation where the database receives a query that joins the fact table to a date dimension table using the date surrogate key, and the query includes a restriction on the real date column in the date dimension table. The query is indirectly restricted on the surrogate date key, the fact table is partitioned on the surrogate date key, and partition elimination should be possible, but modern query optimizers usually do not realize this. Hence, one reason that partitioning fails to deliver the performance benefits it could is that query restrictions that are not directly applied to the partitioned table do not trigger partition elimination even if they could.

Thus, another object of the present disclosure is to improve query performance by tying partitions closer to queries that act upon those partitions. In various embodiments, the present disclosure introduces a partitioning mechanism that closely couples the partitions and the queries that are used to query the partitions.

Another mechanism to enhance query performance is indexing. The index resulting from an indexing operation helps reduce the input/output by allowing the data in a table to be accessed more efficiently, thereby reducing the number of disk accesses needed to fetch particular data from the table. An index works especially well if the query is selective over an indexed column of the table being queried.

Because data in database tables are commonly stored in database blocks, a query using an index access path is most effective when the rows located by the index are stored close together on disk. This results in fewer blocks being accessed for each index entry. In contrast, index based access is less effective when the rows pointed to by each index entry are scattered across many database blocks, because this index may require many database blocks to be read from disk. Thus, the efficiency of an index may be increased by rearranging the rows in a table based on the key used in the index, thereby clustering rows with the same index value on the disk storage medium. This can, however, decrease the efficiency of another index based on another key. The practice of sorting a table is seldom used even if beneficial to some indexes as it is not generally beneficial to all indexes. Generally, no single arrangement of rows is optimal for all indexes.

Thus, another object of the present disclosure is to physically arrange data in order to facilitate efficient data access, such as by clustering data physically according to different data access needs, thus creating an advantageous physical data distribution. In various embodiments, the present disclosure represents a source dataset using multiple fine-grained partitioning schemes employing many small fact and summary tables, thereby creating opportunity for efficient data access to the point where full table scans are fast enough to service the needs of an interactive data access application. This removes the prior art reliance on multiple indexes in order to obtain tolerable query performance over a fact table and simultaneously increases both insert/update performance and query performance.

As discussed above, another one of the causes for slow query performance is complex queries. Modern ERP systems contain hundreds, if not thousands, of tables, and consequently the queries used to extract data from the databases are often complex and inefficient, which contributes to reduced query performance. One mechanism used to accommodate for large, complex queries is to use reports. The benefit of using reports is that they are less time critical compared to interactive query tools. For example, a user may submit a report with parameters and in a reasonably short time, a report is ready. Whether the report execution takes 10, 20, 30, 60, or 300 seconds to execute is not that important because the user can turn his attention to other activities while waiting for the report to execute. The problem with running reports is that they are not suitable for interactive exploratory type interaction between user and data.

Thus, another object of the present disclosure is to provide fast enough database access to allow for instantaneous, or close to instantaneous, browsing and navigation through the dataset. In various embodiments, the present disclosure provides performance that allows for exploratory interactivity over large datasets.

Another issue with data warehouses is data warehouses may suffer from availability issues because of the use of indexes on the fact tables. For example, data warehouses are normally taken off line while loading data into the data warehouse, rebuilding indexes, and refreshing summary tables.

Thus, another object of the present disclosure is to provide uninterrupted access to the database. In various embodiments, the present disclosure provides for around-the-clock availability.

Further, the present disclosure efficiently utilizes performance characteristics of common computer architectures. For example, one common characteristic of modern computers is the use of caches for caching recently used data. After reading data from a secondary storage medium (e.g., a disk), the data will typically be cached in high-speed random access memory (RAM) for some time after the reading takes place.

Thus, another object of the present disclosure is to provide optimized use of computer architectures. In various embodiments, the present disclosure utilizes this fact by arranging for dependent summary tables to be refreshed immediately after the table on which the summary depends is refreshed, thus virtually guaranteeing that the data to be summarized is read from high speed memory (e.g, RAM) instead of being read from secondary storage.

Another common characteristic of many modern computer systems is the use of secondary storage systems that provide higher rates of data transfer throughput when a number of requests occur at sequential continuous storage locations, as opposed to requests to random locations. This can be caused by predictive "read ahead" at various levels in the storage hierarchy.

Thus, another object of the present disclosure is to improve secondary storage performance. Querying a large table may involve reading large amounts of data from disk. Reading data from disk is orders of magnitude slower than reading data from memory (e.g., RAM)). Therefore, one avenue to increase query performance is to minimize the amount of disk input/output. In various embodiments, the present disclosure utilizes this fact by primarily employing full table scans on fact tables or summary fact tables with high row hit ratios, thereby avoiding the overhead of randomly accessing storage locations as is common in the indexed-based access of prior art fact tables.

Another object of the present disclosure is to improve query performance in the data warehouse. Thus, in various embodiments, the present disclosure recommends and employs pre-joining of source system tables. For instance, the pre-joining of source datasets may be implemented in the extraction scripts for various source extraction files. Alternatively, the pre-joining may be implemented in a view employed by those scripts or in procedural programming logic referred to in the source extraction queries. By pre-joining data in the data extraction phase, time-critical interactive queries can respond faster by not joining at interactive query time. For example, a fact record based on a general ledger journal line can be supplemented with related information gathered from many different tables providing additional information that the user might find relevant at query time such as a payment date for an invoice from account payables. This information may be fetched at data extraction time and stored with the fact record in the data warehouse and be readily available without the need for a join operation when producing a response to a user inquiry.

Performance of data warehouse load operations are significantly hampered by indexes on the tables being loaded. However, prior art data warehouses use indexes on the fact tables in order to process queries in a reasonable time, creating a seemingly unavoidable need to maintain multiple large indexes on fact tables. Also, prior art data algorithms for updating a fact table depend on the fact table having a primary key index in order for the algorithm to operate reasonably efficiently.

Thus, another object of the present disclosure is to reduce or remove indexes. In various embodiments, the present disclosure may operate without indexes on the fact tables and outperform a traditional data warehouse on query performance.

Another object of the present disclosure is the efficient use of bulk operations. Database bulk operations are generally more efficient than individual record-by-record operations. The present disclosure utilizes this fact and may be operated using database bulk operations unlike many prior art refresh algorithms that resort to record-by-record operations in order to operate correctly.

Another object of the present disclosure is to provide an efficient change detection system. In general, a data warehouse should be kept in sync with the source systems. This creates the need to detect changes in the source systems and propagate the changes to the data warehouse. In various embodiments of the present disclosure, a change detection system is employed at the source-extraction-file level. For example, the change detection system may include logic to derive a first timestamp from a source system corresponding to a source extraction file, where the first timestamp indicates the most recent time that at least one record in the set of records corresponding to the source extraction file was changed. The change detection system may then compare the first timestamp with the timestamp of the source extraction file and trigger a new extraction if the first timestamp is newer than the timestamp of the source extraction file.

Example 1 describes a system, method, or computer-readable medium for improving query performance, by splitting, using a computer system and in accordance with a data mapping, data from a data source into: a first set of split data portions based on a first attribute of the data, with the first set of split data portions configured to be a source of data for a first set of target relvars; and a second set of split data portions based on a second attribute of the data, with the second set of split data portions configured to be a source of data for a second set of target relvars. Each of the first and second sets of target relvars is created based on the splitting so that data within each set of relvars includes data organized to serve an inquiry restricted by at least one of the first attribute or the second attribute, and the splitting is performed without regard to whether the same data is in more than one target relvar of the first or second set of target relvars, and the data of the data source was extracted from an n-ary relation value in accordance with the data mapping. Example 1 also describes using a portion of the first set of split data portions to refresh the first set of target relvars, and using a portion of the second set of split data portions to refresh the second set of target relvars.

In Example 2, the system, method, or computer-readable medium of Example 1 can be optionally performed or configured such that a target relvar in the first and second sets of target relvars is database table.

In Example 3, the system, method, or computer-readable medium of any one or more of the Examples 1-2 can be optionally performed or configured such that a target relvar in the first and second sets of target relvars is a partition of a database table.

In Example 4, the system, method, or computer-readable medium of any one or more of the Examples 1-3 can be optionally performed or configured such that the n-ary relation value comprises a table, a view, a query, a set of records, or a tuple source.

In Example 5, the system, method, or computer-readable medium of any one or more of the Examples 1-4 can be optionally performed or configured such that using the portion of the first set of split data portions to refresh the first set of target relvars comprises creating a relvar when the relvar does not exist in the first set of target relvars and updating the relvar.

In Example 6, the system, method, or computer-readable medium of any one or more of the Examples 1-5 can be optionally performed or configured such that a majority of the data from the data source is contained within each of the first and second sets of target relvars, but arranged differently in the first set of target relvars than in the second set of target relvars.

In Example 7, the system, method, or computer-readable medium of any one or more of the Examples 1-6 can be optionally performed or configured such that the majority of data from the data source comprises the entirety of the data source.

In Example 8, the system, method, or computer-readable medium of any one or more of the Examples 1-7 can be optionally performed or configured such that the splitting and using operations are repeated to accommodate a new extraction of data from the data source to extract new data from the data source, and the using operations include updating data within the first and second sets of target relvars to reflect the new data extracted from the data source.

In Example 9, the system, method, or computer-readable medium of any one or more of the Examples 1-8 can be optionally performed or configured such that the updating comprises discarding data in the target relvars and replacing the discarded data with data from corresponding split data portions from the repeated splitting.

In Example 10, the system, method, or computer-readable medium of any one or more of the Examples 1-9 can be optionally performed or configured such that the updating comprises performing a full refresh operation.

In Example 11, the system, method, or computer-readable medium of any one or more of the Examples 1-10 can be optionally performed or configured such that the using operations comprise: comparing the first set of split data portions from the splitting with the first set of split data portions from the repeated splitting to detect modification of data in the first set of split data portions from the repeated splitting; and comparing the second set of split data portions from the splitting with the second set of split data portions from the repeated splitting to detect modification of data in the second set of split data portions from the repeated splitting.

In Example 12, the system, method, or computer-readable medium of any one or more of the Examples 1-11 can be optionally performed or configured such that the using further comprises refreshing a summary relvar that is dependent on the at least one relvar of the first and second sets of target relvars.

In Example 13, the system, method, or computer-readable medium of any one or more of the Examples 1-12 can be optionally performed or configured such that each of the first and second attributes is selected based on a portion of a query likely to be used on the first and second target relvars, respectively.

In Example 14, the system, method, or computer-readable medium of any one or more of the Examples 1-13 can be optionally performed or configured such that the first attribute is related to a time dimension.

In Example 15, the system, method, or computer-readable medium of any one or more of the Examples 1-14 can be optionally performed or configured such that the data source and the target relvars are in the same database.

In Example 16, the system, method, or computer-readable medium of any one or more of the Examples 1-15 can be optionally performed or configured such that the data source and the target relvars are in different databases.

In Example 17, the system, method, or computer-readable medium of any one or more of the Examples 1-16 can be optionally performed or configured such that the using further comprises: utilizing at least one template to generate instructions for refreshing the first and second sets of target relvars based on the respective first and second split data portions, with each of the at least one templates customized for a subset of at least one of the first and second sets of split data portions.

In Example 18, the system, method, or computer-readable medium of any one or more of the Examples 1-17 can be optionally performed or configured for automatically generating a name of a target relvar in accordance with the data mapping, with the target relvar associated with at least one of the first and second set of target relvars.

In Example 19, the system, method, or computer-readable medium of any one or more of the Examples 1-18 can be optionally performed or configured such that the name of the target relvar reflects how the data is split.

In Example 20, the system, method, or computer-readable medium of any one or more of the Examples 1-19 can be optionally performed or configured such that the name of the target relvar reflects a range of data contained within the target relvar.

In Example 21, the system, method, or computer-readable medium of any one or more of the Examples 1-20 can be optionally performed or configured for using a name of a target relvar as part of a hash function to service an incoming inquiry.

In Example 22, the system, method, or computer-readable medium of any one or more of the Examples 1-21 can be optionally performed or configured for matching a restriction element of an incoming inquiry against names of target relvars in the first and second sets of target relvars to locate a target relvar configured to deliver data related to the incoming inquiry; and generating a query directed to the located target relvar to produce a result for the incoming inquiry.

Example 23 describes a system, method, or computer-readable medium to split data extracted from a data source into: a first set of data based on a first attribute of the extracted data, with the first set of data configured to be used to refresh a first set of target relvars; and a second set of data based on a second attribute of the extracted data, with the second set of data configured to be used to refresh a second set of target relvars. Each of the first and second sets of target relvars is configured so that data within each set of relvars is organized to provide a response to an inquiry restricted by at least one of the first attribute or the second attribute. Example 23 also uses the first set of data to refresh the first set of target relvars and the second set of data to refresh the second set of target relvars.

In Example 24, the system, method, or computer-readable medium of Example 23 can be optionally performed or configured to extract data from the data source in accordance with a mapping that maps data from the data source to the first and second sets of target relvars.

In Example 25, the system, method, or computer-readable medium of any one or more of the Examples 23-24 can be optionally performed or configured such that a first majority of the data is contained within the first set of target relvars, and wherein a second majority of the data is contained within the second set of target relvars.

In Example 26, the system, method, or computer-readable medium of any one or more of the Examples 23-25 can be optionally performed or configured to repeat the split and use operations to accommodate new data contained in a new extraction from the data source as compared to the extracted data.

In Example 27, the system, method, or computer-readable medium of any one or more of the Examples 23-26 can be optionally performed or configured to selectively perform a data update of the first and second sets of relvars to reflect the new data.

In Example 28, the system, method, or computer-readable medium of any one or more of the Examples 23-27 can be optionally performed or configured to perform a full refresh operation.

In Example 29, the system, method, or computer-readable medium of any one or more of the Examples 23-28 can be optionally performed or configured to perform a data refresh of a summary relvar that is dependent on at least one relvar of the first and second sets of target relvars, upon the refresh of the at least one relvar of the first and second sets of target relvars.

In Example 30, the system, method, or computer-readable medium of any one or more of the Examples 23-29 can be optionally performed or configured to utilize a plurality of templates to refresh the first and second sets of target relvars.

In Example 31, the system, method, or computer-readable medium of any one or more of the Examples 23-30 can be optionally performed or configured such that each of the templates being configured to be used in the generation of particular table generation or table update instructions for a subset of the sets of data.

In Example 32, the system, method, or computer-readable medium of any one or more of the Examples 23-31 can be optionally performed or configured to generate names of split data portions corresponding to the datasets according to one of the first and second attributes used in the splitting.

In Example 33, the system, method, or computer-readable medium of any one or more of the Examples 23-32 can be optionally performed or configured to utilize the plurality of templates by selecting a template based on an association of the name of a split data portion and the template.

In Example 34, the system, method, or computer-readable medium of any one or more of the Examples 23-33 can be optionally performed or configured to generate database instructions for refreshing a summary relvar, with the summary relvar related to at least one relvar in the first and second sets of target relvars.

In Example 35, the system, method, or computer-readable medium of any one or more of the Examples 23-34 can be optionally performed or configured to generate database instructions that: create the at least one summary relvar upon creation of a target relvar from which the summary relvar depends and refresh the at least one summary relvar upon the refresh of a target relvar from which the summary relvar depends.

In Example 36, the system, method, or computer-readable medium of any one or more of the Examples 23-35 can be optionally performed or configured to make the refreshed summary and target relvars available essentially simultaneously to a client application.

Example 37 describes a system, method, or computer-readable medium to provide or implement a computing system, comprising a processor, that is configured to implement: a splitter component configured to split data extracted from a data source into a first set of split data portions based on a first attribute of the extracted data, with the first set of split data portions configured to be used as a source for a first set of target relvars; and a second set of split data portions based on a second attribute of the extracted data, with the second set of split data portions configured to be used as a source for a second set of target relvars, and the second attribute being different from the first attribute. Data within each set of relvars is organized according to an inquiry restricted by at least one of: the first attribute or the second attribute. Example 37 also provides or implements a loader component configured to use the first and second split data portions to refresh a corresponding target relvar.

In Example 38, the system, method, or computer-readable medium of Example 37 can be optionally performed or configured such that the computing system is further configured to implement: an extraction component configured to generate the extracted data by selecting data from a tuple source in the data source in accordance with a mapping, wherein the mapping maps data from the data source to the plurality of relvars.

In Example 39, the system, method, or computer-readable medium of any one or more of the Examples 37-38 can be optionally performed or configured such that the computing system is further configured to implement: a template expander component configured to: access a plurality of parameters; identify a list of the split data portions to be used for relvar refresh operations; for each of the split data portions to be used for relvar refresh operations: locate a template associated with the split data portion; and generate, using the template and the plurality of parameters, a plurality of instructions to be used by the loader component for refreshing a target relvar of the first or second set of target relvars using the associated split data portion.

In Example 40, the system, method, or computer-readable medium of any one or more of the Examples 37-39 can be optionally performed or configured such that the template expander component is further configured to generate, for at least one of the split data portions to be used for relvar refresh, instructions for generating dependent summary relvars to be used by the loader component.

In Example 41, the system, method, or computer-readable medium of any one or more of the Examples 37-40 can be optionally performed or configured such that the template expander component is further configured to identify a template using the name of a split data portion.

In Example 42, the system, method, or computer-readable medium of any one or more of the Examples 37-41 can be optionally performed or configured such that the loader component is further configured to utilize a bulk load procedure to load the first and second sets of split data portions.

In Example 43, the system, method, or computer-readable medium of any one or more of the Examples 37-42 can be optionally performed or configured such that the splitter component is further configured to save the first and second sets of split data portions for comparison with sets of split data portions created by splitting a later set of extracted data from the data source.

In Example 44, the system, method, or computer-readable medium of any one or more of the Examples 37-43 can be optionally performed or configured such that the computing system is further configured to compare the first and second split data portions with a previously saved version of the first and second sets of split data portions to identify modified split data portions and propagate the modified split data portions to the load operation.

In Example 45, the system, method, or computer-readable medium of any one or more of the Examples 37-44 can be optionally performed or configured such that the first and second sets of target relvars are in a database that does not include the data source.

This summary is intended to provide an overview of certain subject matter of the present patent application. It is not intended to provide an exclusive or exhaustive explanation of the invention. The Detailed Description is included to provide further information about the subject matter of the present patent application.

BRIEF DESCRIPTION OF DRAWINGS

Embodiments are illustrated by way of example and not limitation in the figures of the accompanying drawings, in which like references indicate similar elements and in which:

FIG. 4 is a code listing illustrating a data extraction script, in accordance with various embodiments;

FIG. 5 is a table illustrating an example of the "tx_lines" table, in accordance with various embodiments;

FIG. 6 is a code listing illustrating command lines to execute an extraction script, in accordance with various embodiments;

FIG. 7 is a set of data extraction files, in accordance with various embodiments;

FIG. 8 is a code listing illustrating a splitter configuration, in accordance with various embodiments;

FIG. 9 is a code listing of splitting schemes, in accordance with various embodiments;

FIG. 10 is a code listing illustrating a portion of a splitting script generated by a splitting program, in accordance with various embodiments;

FIG. 14 is a code listing illustrating the loader program, in accordance with various embodiments;

FIG. 15 is a code listing illustrating matching rules for the loader program, in accordance with various embodiments;

FIG. 16 is a code listing illustrating a portion of the template expander, in accordance with various embodiments;

FIG. 17 is a code listing illustrating a portion of the subroutines of the template expander, in accordance with various embodiments;

FIG. 18 is a code listing illustrating a load/summary template, in accordance with various embodiments;

FIG. 19 is a code listing illustrating a load/summary script, in accordance with various embodiments;

FIG. 20 is a code listing illustrating a load/summary template, in accordance with various embodiments;

FIG. 21 is a code listing illustrating a load/summary script, in accordance with various embodiments;

FIG. 22 is a code listing illustrating an implementation of splitting schemes in a database, in accordance with various embodiments;

FIG. 23 is a code listing illustrating examples of syntax used to create dynamic partitions by expression, in accordance with various embodiments;

Figure 1:
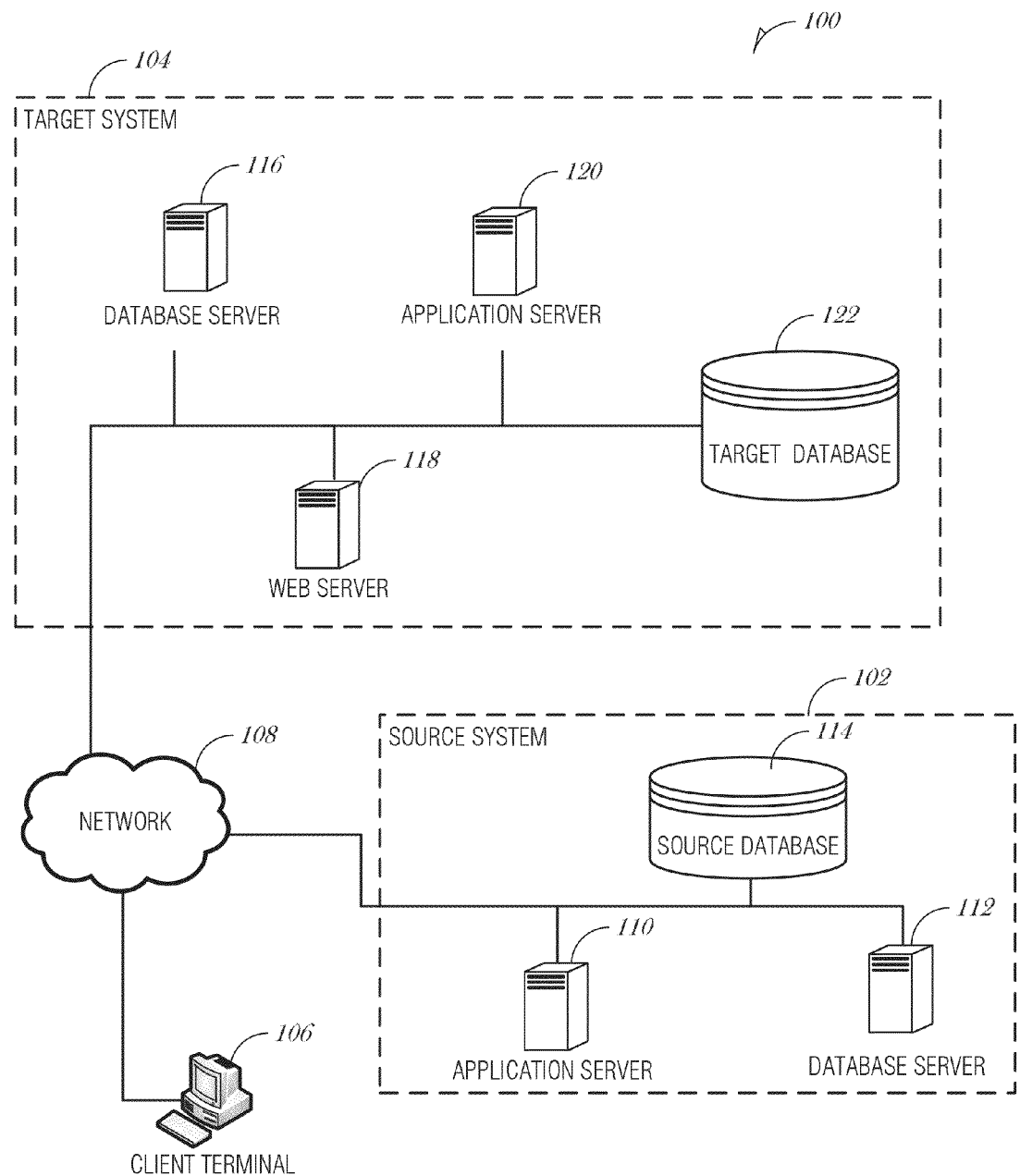
FIG. 1 is a schematic view illustrating a computer network system, according to various embodiments.

In the following Detailed Description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

DETAILED DESCRIPTION

Overview

In the following description, a program is comprised of computer-readable instructions stored on a computer-readable media, which when executed by a computing device causes certain logic to be instantiated and causes certain physical effects to happen.

In a relational database, a relation is a data structure that includes a heading and an unordered set of tuples that share the same type. A heading is the unordered set of certain attributes (columns). A heading has zero or more attributes. An attribute has an attribute name and a domain. The domain may be considered a data type, or simply, type. A relation has zero or more tuples. A degree of a relation is the number of attributes that constitute a heading. The degree of a relation value is an integer value of zero or greater. An n-ary relation is a relation value that has a degree of n. The cardinality of a relation is the number of tuples that constitutes a relation value. A relation value is an instance of a relation. A relational variable ("relvar") is a variable that has a relation value and is used to differentiate between a variable that contains a relation and the relation itself.

In a database, data is commonly arranged in tables, which are structured using rows and columns (e.g., attributes). Each row has attributes (or columns), which contain the values of the row. The values of a row in a table are also referred to as a "tuple." The term source dataset refers to a table, a view, a query, or a set of records/tuples. Target tables are tables or functional equivalents thereof, such as flat file tables.

The term data source refers to one or more logical or physical databases, tables in a database, or relvars.

The term refresh refers to updating data, which may be performed in numerous ways, such as by dropping and replacing a table; incremental update; emptying an existing table and inserting data; or using a temporary table and renaming the temporary table to take the place of the table to be refreshed.

The term source-partitioning scheme means the way in which data extraction for the target database is limited. The use of the phrase "refresh of a table" or similar phrases does not imply that the table mentioned existed before the refresh operation. Likewise, the meaning of the phrase "maps data from the data source to the target tables" or similar phrases do not imply that the target tables exist. The term data warehouse means a database.

The term split data portion refers to data separated from other data and stored in volatile or non-volatile storage. In various embodiments, a split data portion may refer to a file stored on a computer-readable medium, which is to be used to load a table in a target database.

The source database and the target database are not necessarily different databases and may be hosted on the same or different computing devices. Thus, although the system is illustrated in a context of a single source database and a single target database, it is understood that the disclosure is readily applicable to multiple source databases and/or multiple target databases.

FIG. 1 is a schematic view of a computer network system 100 according to various embodiments. The computer network system 100 includes a source system 102, a target system 104, and a client terminal 106, communicatively coupled via a network 108. In an embodiment, the source system 102 includes an application server 110, a database server 112, and a source database 114. In some embodiments, the application server 110 hosts an ERP application. In some embodiments, the source database comprises an ERP database and a traditional data warehouse database with one or more large fact tables.

The target system 104 includes a database server 116, a web server 118, and an application server 120, coupled to a target database 122. The web server 118 may communicate with the target database 122 to serve inquiries for data stored in the target database 122. The web server 118 may also communicate or interface with the application server 120 to enable web-based presentation of information. For example, the application server 120 may consist of scripts, applications, or library files that provide primary or auxiliary functionality to the web server 118 (e.g., multimedia, file transfer, or dynamic interface functions). The web server 118 may provide an interactive user-interface to data in the target database 122. The user-interface may be implemented using a variety of programming languages or programming methods, such as HTML (HyperText Markup Language), Perl, VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

The source system 102 or target system 104 may be a distributed system; for example, one or more elements of a system may be located across a wide-area network (WAN) from other elements of the system. A server (e.g., application server 110 or database server 112, 116) may represent a group of two or more servers, cooperating with each other, and provided by way of a pooled, distributed, or redundant computing model or they may be virtual servers hosted on one or more physical computers. In addition, in some embodiments, servers (e.g, application server 110 or database server 112) may be combined, such that a single server provides the functionality of a web server and a database server, for example.

The network 108 may include local-area networks (LANs), wide-area networks (WANs), wireless networks (e.g., 802.11 or cellular network), the Public Switched Telephone Network (PSTN) network, ad hoc networks, personal area networks (e.g., Bluetooth) or other combinations or permutations of network protocols and network types. The network 108 may include a single LAN or WAN, or combinations of LANs or WANs, such as the Internet. The various devices coupled to the network 108 may be coupled to the network 108 via one or more wired or wireless connections.

In an embodiment, the client terminal 106 may include a client program to interface with the source system 102 or target system 104. The client program may include commercial software, custom software, open source software, freeware, shareware, or other types of software packages. In an embodiment, the client program includes a lightweight client designed to provide query and data manipulation tools for a user of the client terminal 106. The client program may interact with a server program hosted by, for example, the application server 110, the web server 118, or another server in the target system 104. Additionally, the client program may interface with the database server 116. Using client programs provides users interactive access to data in the target database 122.

The source database 114 may be composed of one or more logical or physical databases. For example, the source database 114 may be viewed as a system of databases that, when viewed as a compilation, represent a "source database." The source database 114 may be implemented as a relational database, a centralized database, a distributed database, an object oriented database, or a flat database, in various embodiments.

The target database 122 may be composed of one or more logical or physical databases. For example, the target database 122 may be viewed as a system of databases that, when viewed as a compilation, represent a "target database." The target database 122 may be implemented as a relational database, a centralized database, a distributed database, an object oriented database, or a flat database, in various embodiments.

During operation, data from one or more data sources (e.g., source database 114) are imported into the target database 122. It is understood that the source database 114 may represent multiple databases, possibly from multiple locations, and that the source database 114 is merely used to indicate that data is obtained from a data source. For example, data sources may exist within an organization, such as a sales department or a subsidiary corporation, or exist at an external source, such as a business affiliate or a public record source. The data may be imported on a scheduled basis, such as weekly, monthly, quarterly, or some other regular or periodic interval. Alternatively, the data may be imported on-demand.

Figure 2:
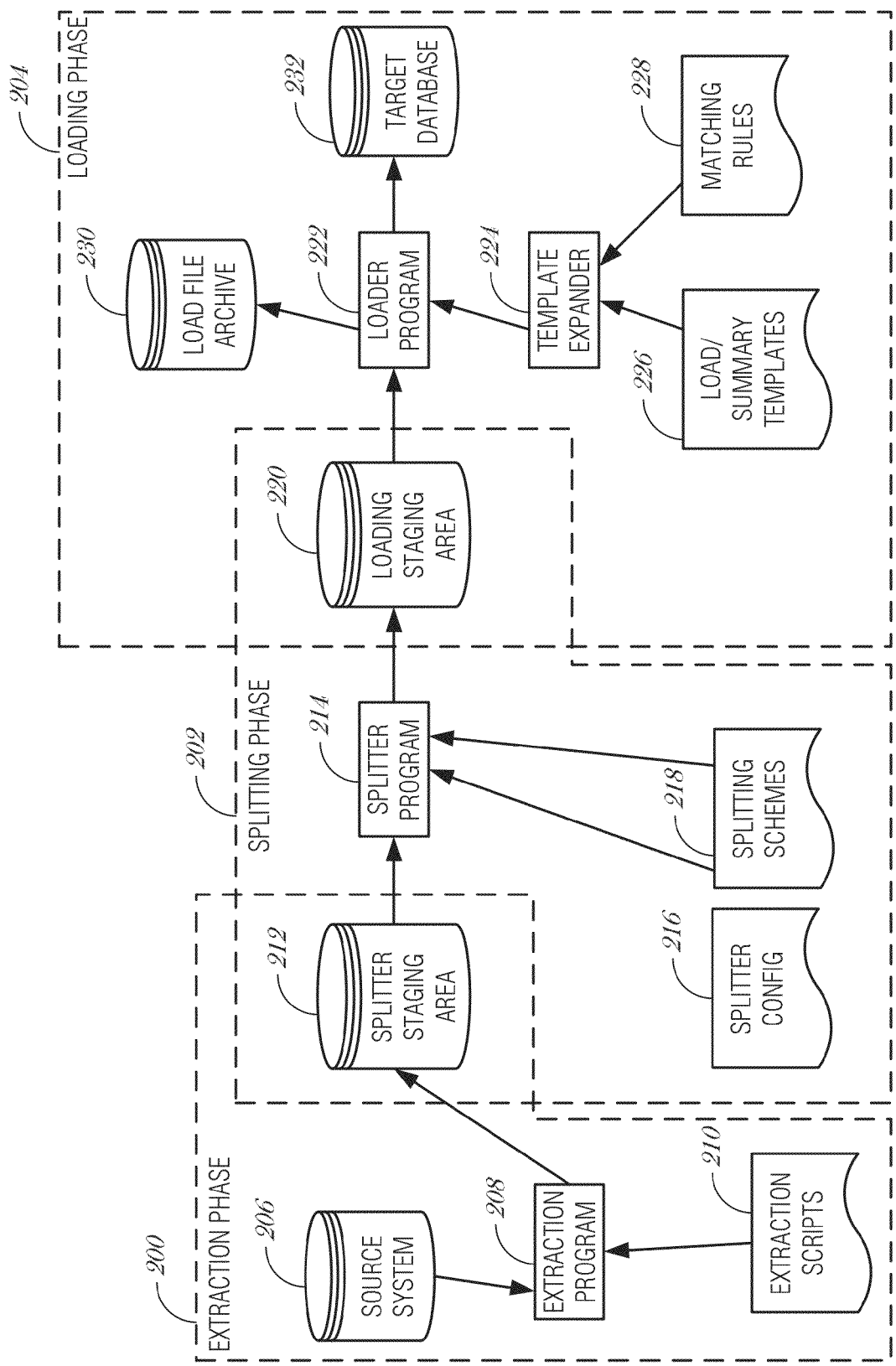
FIG. 2 is a diagram illustrating components of an operating environment to perform functions of the present disclosure, according to various embodiments.

FIG. 2 is a diagram illustrating components of an operating environment to perform functions of the present disclosure, according to various embodiments. Functions may be performed in whole or in part in a computer network system 100, as described in FIG. 1. In FIG. 2, the various elements may be distributed among several computer systems, real or virtualized. The overall process can be organized into three main phases: extraction, splitting, and loading. The extraction phase 200, splitting phase 202, and loading phase 204 are illustrated with dashed-lined boxes in order to group operational components and facilitate discussion. It is understood that the phases are arbitrary and do not impose restrictions on the operational components corresponding to each phase.

The extraction phase 200 generally relates to extracting data from a tuple source and saving the data into one or more extraction files. A tuple source may include one or more of a database, a flat file, a table, a view, or results of a query. The extraction files may be considered partitions and may be implemented as flat files or tables in a database. The extraction phase 200 includes a source system 206, an extraction program 208, one or more extraction scripts 210, and a splitter staging area 212.

The source system 206 may include an operational system, for example an ERP system. In another example, the source system 206 may be a traditional data warehouse using star schema. The one or more extraction scripts 210 may be configured by a developer. Extraction scripts 210 provide a partitioning scheme to partition data from the source system 206 into one or more extraction files. After configuration, the extraction program 208 extracts data from the source system 206 utilizing extraction scripts 210, and stores the extracted data in the splitter staging area 212.

The splitting phase 202 generally relates to splitting the extracted data in accordance with a splitting scheme. The splitting scheme defines how data is to be split into data portions (e.g., load files), where each portion is destined for a target table. The splitting scheme may be dependent on one or more attributes of the tuple source. In the example illustrated in FIG. 2, the splitting phase 202 includes the splitter staging area 212, a splitter program 214, a splitter configuration 216, one or more splitting schemes 218, and a loading staging area 220. In alternative embodiments, a non-disk-based staging area may utilize memory-based splitting areas. In some embodiments, the staging areas may be implemented inside a database as segments or tables. In alternative embodiments, the loading staging area 220 is omitted, and split data portions may be streamed directly into a load process.

A developer may configure the splitter program 214 using the splitter configuration 216. In an embodiment, the splitter configuration 216 includes a location of splitting schemes 218, a location of extraction files (e.g., the splitter staging area 212), and a filename pattern to be used for matching filenames of the extraction files to be split.

In addition, a developer may configure the splitting schemes 218. Splitting schemes 218 map data from the source partitions stored in the splitter staging area 212 to multiple smaller and more manageable chunks. In an embodiment, the splitting schemes 218 map data to one or more split data portions, which are then stored at the loading staging area 220. It is understood that the splitter staging area 212 and the loading staging area 220 may be located at the same server or in the same database.

Using the splitter configuration 216 and the splitting schemes 218, the splitter program 214 generates a script. The script is thus dynamically created based on the configuration variables in each of the splitter configuration 216 and the splitting schemes 218. The script may then be executed to access the extraction files in the splitter staging area 212 and split each extraction file according to the splitting schemes 218. The splitter program 214 may then propagate changes. In an embodiment, the splitter program 214 propagates changes by copying split data portions to a propagation directory in the loader staging area 220. In an embodiment, a propagation queue is implemented using a Unix print queue as a file transport mechanism. The print queue is used to propagate split data portions over the network from a source system to a target system. In alternative embodiments, a queuing mechanism is used and the splitter program places split data portions in the queue to be propagated to the loading staging area 220. Queuing services such as IBM® WebSphere®, Microsoft® Message Queuing, and Oracle® Advanced Queuing® may be used. Queuing provides advantages of guaranteed delivery and asynchronous communication.

The loading phase 204 generally relates to creating and populating target tables. The loading phase 204 includes the loading staging area 220, a loader program 222, a template expander 224, one or more load/summary templates 226, matching rules 228, a load file archive 230, and a target database 232. Matching rules 228 include declarative expressions, a lookup table, an associative array, or other mechanisms to associate split data portions with load/summary templates 226. In an embodiment, after extracting and splitting the files in the extraction phase 200 and splitting phase 202, respectively, split data portions are saved to the loading staging area 220, where the loader program 222 invokes a template expander 224. The template expander 224 uses load/summary templates 226 and matching rules 228 to produce the load script for the target database 232. The loader program 222 communicates the generated load script to a database utility (not shown), which loads the data in the target database 232. After loading the data into the target database 232, the loader program 222 optionally moves the split data portions from the loading staging area 220 to the load file archive 230. In an embodiment, the extraction files and split data portions are kept in the splitter staging area 212 and copies of new or changed files are propagated to the loading staging area 220. In some situations, the splitting is omitted from the process, and extraction files are loaded to the target database 232.

Figure 3:
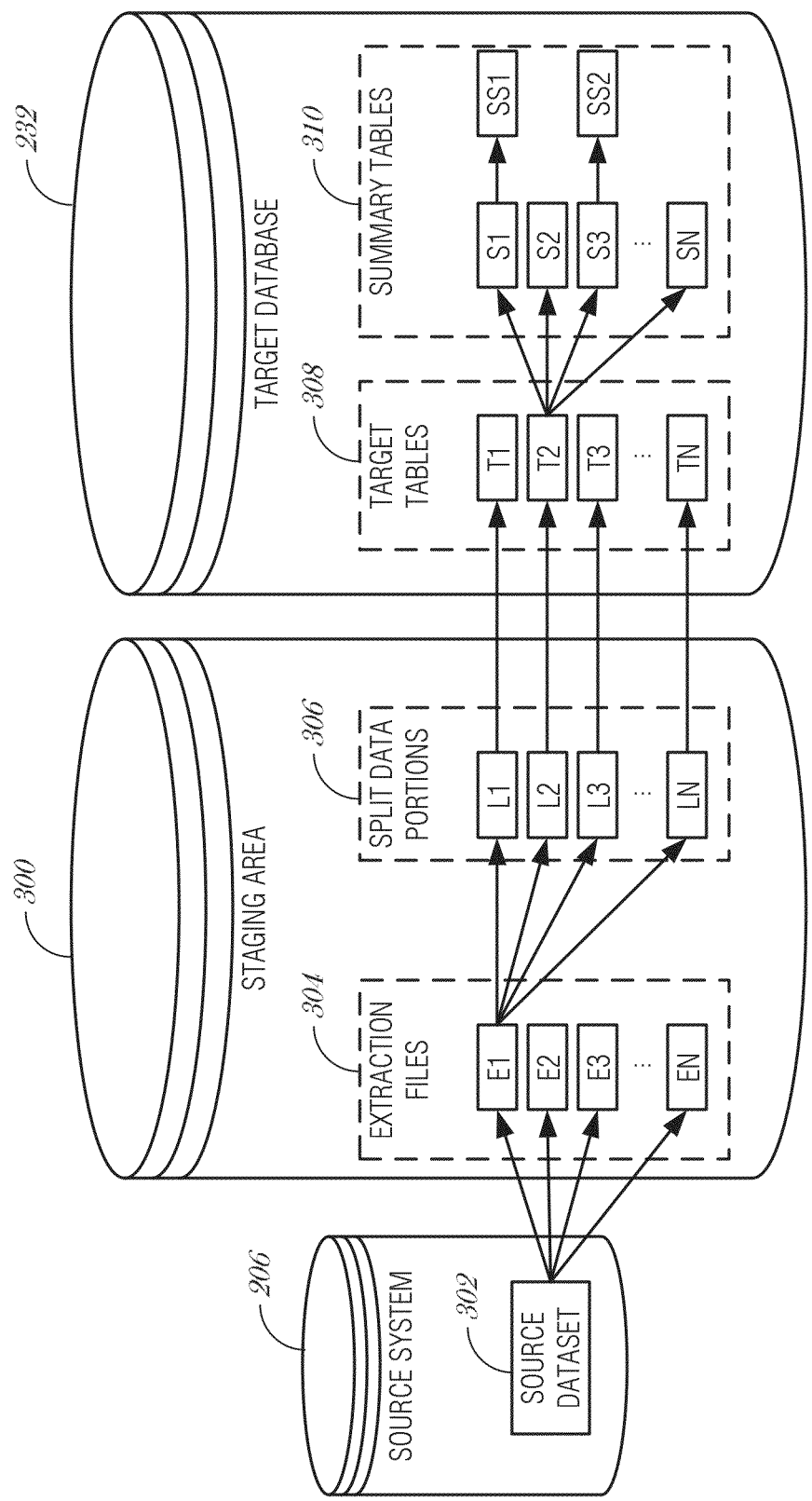
FIG. 3 is a diagram illustrating data flow from the source system to the target database, in accordance with various embodiments.

FIG. 3 is a diagram illustrating data flow from the source system 206 to the target database 232, in accordance with various embodiments. In the example illustrated in FIG. 3, a staging area 300 is shown that includes both the splitter staging area 212 and loading staging area 220 from FIG. 2. With reference to FIG. 2, the extraction program 208 may read a source dataset 302 and produce extraction files 304, exemplified by blocks E1, E2, E3 . . . EN. The extraction program 208 may be configured using a source-partitioning scheme. The source-partitioning scheme is embodied by the extraction scripts 210. The source-partitioning scheme may produce any number of extraction files 304. The source-partitioning scheme may be based on a time dependent variable, such as a month, year, or other period. For instance, in a sales database, the source dataset 302 may contain sales information. A source-partitioning scheme may partition the extraction from a source dataset month-by-month, such that each extraction file 304 contains a particular month's worth of data.

After the extraction program 208 produces the extraction files 304, the splitter program 214 splits the extraction files 304 into smaller split data portions 306, exemplified by blocks L1, L2, L3 . . . LN. In the examples shown, extraction file E1 is split into multiple split data portions L1 . . . LN based on a splitting scheme 218. It is understood that other extraction files E2 . . . EN may be split in a similar manner. Continuing with the example from above, if each extraction file 304 contains a particular month's worth of data, the splitter program 214 may further divide the data based on a product ID and store ID splitting scheme. As a result, split data portions 306 may contain monthly sales data for particular products at a particular store. As another example, if a splitting scheme dictated a split based on promotion ID, then the split data portions 306 would each contain sales data for a particular promotion, extracted from the sales data contained in the corresponding extraction files 304. It is understood that a source dataset 302 may be mapped to a very large number of split data portions 306. In some instances, there could be thousands, hundreds of thousands, or even millions of split data portions.

The loader program 222 then loads the split data portions 306 into target tables 308, exemplified by T1, T2, T3 . . . TN. In the example of FIG. 3, split data portions 306 are loaded into corresponding target tables 308. It is understood that other split data portions 306 generated from other extraction files 304 may be loaded into target tables 308 in a similar manner.

In an embodiment, the loader program 222 refreshes all summary tables 310 that are dependent upon the target tables 308. This is exemplified in FIG. 3 where target table T2 has dependent summary tables S1, S2, S3 SN, which are refreshed. In addition, second level summary tables SS1 (dependent on S1) and SS2 (dependent on S3) are also refreshed.

In an embodiment, when loading split data portions 306 into their respective target tables 308, any respective dependent summary tables 310 are also refreshed. As those skilled in the art will recognize, the two-level splitting of data from source dataset 302 to extraction files 304 and then from extraction files 304 to split data portions 306 may be combined into a single step from source dataset 302 to split data portions 306 without changing the overall mapping of the source dataset 302 to target tables 308 and summary tables 310 in the target database 232. This variation is considered within the scope of the present disclosure.

In various embodiments, the details of the data mapping from the source dataset 302 to the target database 232 are embodied in the extraction scripts 210, splitter configuration 216, splitting schemes 218, load/summary templates 226, and matching rules 228.

In various embodiments, naming conventions are used to uniquely name extraction files 304 and split data portions 306. The use of naming conventions provides an efficient means for automating portions of the process. For instance, the loader program 222 may determine which load/summary templates 226 are to be used to load a split data portion based on matching rules 228 that associate the filename of a split data portion with a load/summary template 226. The matching rules 228 may be expressed using regular expressions, thereby providing a standardized mechanism for mapping a split data portion filename to a load/summary template 226.

As those skilled in the art will recognize, there are means, other than a naming convention, that may be employed to keep track of data mapping and such means are to be construed within the scope and spirit of the current disclosure.

Example Implementations

In this section, specific examples are provided to illustrate an exemplary implementation. These are not to be construed as limiting. While some of the computer code is presented using specific languages, such as awk or Perl, it is understood that other programming languages or constructs may be used that achieve the same or similar result.

The context for these examples is a sales database containing sales data from several stores, each with a unique identifier. The sales database also includes other pertinent data, such as a product group ID, a product ID, a promotion ID, a transaction year, a transaction month, a transaction day, and a transaction amount. It is understood that more data elements may be contained in the sales database without detracting from the scope and meaning of these examples.

Extraction Phase

Returning to the discussion of the extraction phase 200, FIGS. 4-7 illustrate portions of the extraction scripts 210 and output of the extraction program 208. FIG. 4 is a code listing illustrating a data extraction script, in accordance with various embodiments. The data extraction script is invoked with two parameters: year and month. The parameters reflect a source-partitioning scheme.

In the example extraction script, when executed with the parameters "2010" and "01" (referring to the year and month of interest), the script will extract data from a source dataset named "tx_lines" in a source database. In particular, the script connects to a database (line 5), performs input validation (lines 8-14), sets the staging directory (line 15), and creates the extraction filename using the input parameters as part of the filename (line 17). The data extraction file illustrates a naming convention. The script then sets up the structured query language (SQL) query (lines 18-29). The SQL query employs a "where" clause to restrict the extracted data to the specified year and month. The record set is retrieved (lines 30-32) and written to the extraction file (lines 34-43).

FIG. 5 is a table 500 illustrating an example of the "tx_lines" table, in accordance with various embodiments. The table 500 contains nine records of sample data. FIG. 6 is a code listing illustrating command lines 600 to execute an extraction script, in accordance with various embodiments. FIG. 7 is a set of data extraction files, in accordance with various embodiments. In particular, the extraction files illustrated in FIG. 7 are a result of executing the data extraction script (FIG. 4) with the parameters illustrated in the command lines 600 (FIG. 6) on the "tx_lines" table illustrated in FIG. 5. Notice the data extraction files have filenames that conform to the naming convention embodied in the data extraction script.

In an embodiment, data in the data extraction files is stored in flat text files with one record per line using the character '|' as field separator. The '|' character is not normally used inside database fields, as opposed to other alternatives such as the comma character ',', which is more likely to be used. It is understood that other characters may be used as a field delimiter.

In some embodiments, line breaks in data fields are replaced with spaces when saving a record to a data extraction file. Some bulk loaders are incapable of handling line breaks, and this step is for compatibility.

Splitting Phase

Turning to the splitting phase 202, as discussed with reference to FIG. 2, the splitter program 214 uses the splitter configuration 216 and splitting schemes 218 when splitting the extraction files into split data portions. FIGS. 8-12 illustrate portions of the splitting script, configuration files, and output of the script.

FIG. 8 is a code listing illustrating a splitter configuration, in accordance with various embodiments. The splitter configuration illustrated in FIG. 8 includes three lines of configuration variables. The first line 800 sets a variable "splitting_schemes" that identifies the splitting schemes for the configuration. The second line 802 sets a variable "extraction files" that identifies the location and filename/table prefix of the data extract files (e.g., the splitter staging area 212). Other extraction scripts may use alternative filename/table prefixes, allowing several extraction scripts to operate in the same extraction file directory. The third line 804 sets a variable "filename_pattern" that defines a regular expression to use when checking for the proper filenames to be included in the splitting operation.

FIG. 9 is a code listing of splitting schemes, in accordance with various embodiments. In particular, FIG. 9 is an example of the "splitting_schemes" file, as identified by the first line 800 of the splitter configuration of FIG. 8. The file contains three splitting schemes. Each line in FIG. 9 defines a splitting scheme to be employed by the splitter program 214. In an embodiment, the splitting scheme is defined as an expression in the awk language syntax. The expression defines a character string that will become part of a load filename and later part of a table name in the target database. The expression refers to the content of a record by using the standard awk variables $1, $2 $n, where $1 upon execution will resolve to the first field in a data extraction file, and $2 to the next field, and so on.

In the context of the continuing example, when the splitting schemes in FIG. 9 are used on the table 500 from FIG. 5, the $1 variable will resolve to the value for "store_id", $2 to "product_group_id", $3 to "product_id", and $7 to "tx_dayom".

The first splitting scheme 900 contains the expression: "s"$1"_pg"$2. This means that for each data extraction file for which this splitting scheme is employed, the records in the files are to be copied into split data portions with a naming convention based on the expression. In this case, the string result of the awk expression is a string containing the character 's' followed by the store_id ($1), followed by the string "_pg", which is followed by the product_group_id ($2).

The second splitting scheme 902 contains the expression: "d"$7. This means that for each data extraction file for which this splitting scheme is employed, the records in the files are to be copied into split data portions with a naming convention based on the expression. In this case, the string result of the awk expression is a string containing the character 'd' followed by the tx_dayom ($7).

The third splitting scheme 904 contains the expression: "pr"$3. This means that for each data extraction file for which this splitting scheme is employed, the records in the files are to be copied into split data portions with a naming convention based on the expression. In this case, the string result of the awk expression is a string containing the string "pr" followed by the product_id ($3).

Each line in the splitting schemes configuration file causes a separate set of split data portions to be generated based on the variables identified in the awk expression. For example, in the first splitting scheme 900, a separate split data portion is generated for each combination of store_id and product_group_id from each data extraction file. These split data portions will ultimately end up in respective separate tables in the target database. Furthermore, depending on the content of a load/summary template, more than one summary table may be generated.

FIG. 10 is a code listing illustrating a portion of a splitting script generated by a splitting program, in accordance with various embodiments. The splitting program generates a splitting script by looping over the list of extraction files and for each extraction file, generating splitting code in the script for each splitting scheme. These nested loops result in a permutation of every extraction file being split according to every splitting scheme. For illustration, each while-loop in the generated script in FIG. 10 splits one data extraction file according to one splitting scheme.

The first while-loop 1000 splits the data extraction file 700 according to splitting scheme 900. The next while-loop 1002 splits the same data extraction file 700 according to splitting scheme 902. The third while-loop 1004 splits the same data extraction file 700 according to splitting scheme 904. Not shown in FIG. 10 are similar while-loops for the files 702 and 704. The last while-loop 1006 splits the last file 704 according to the last splitting scheme 904.

Each while-loop reads a record from an extraction file and defines a string variable using the field from the record (as designated by the particular splitting scheme). The string identifies a unique filename that implements a naming convention based on the corresponding splitting scheme. The while-loop then writes the record to the file with the filename, as constructed from the expression in the splitting scheme. Thus, as each record is read from an extraction file, it is written to an appropriate file, by either appending to an existing file or creating a new file.

In the step of executing the splitting script, the splitting program executes the generated awk script (FIG. 10) using the awk interpreter. This results in a set of split data portions. Split data portions are illustrated in FIG. 11, according to the continued example.

Figures 11, 12:
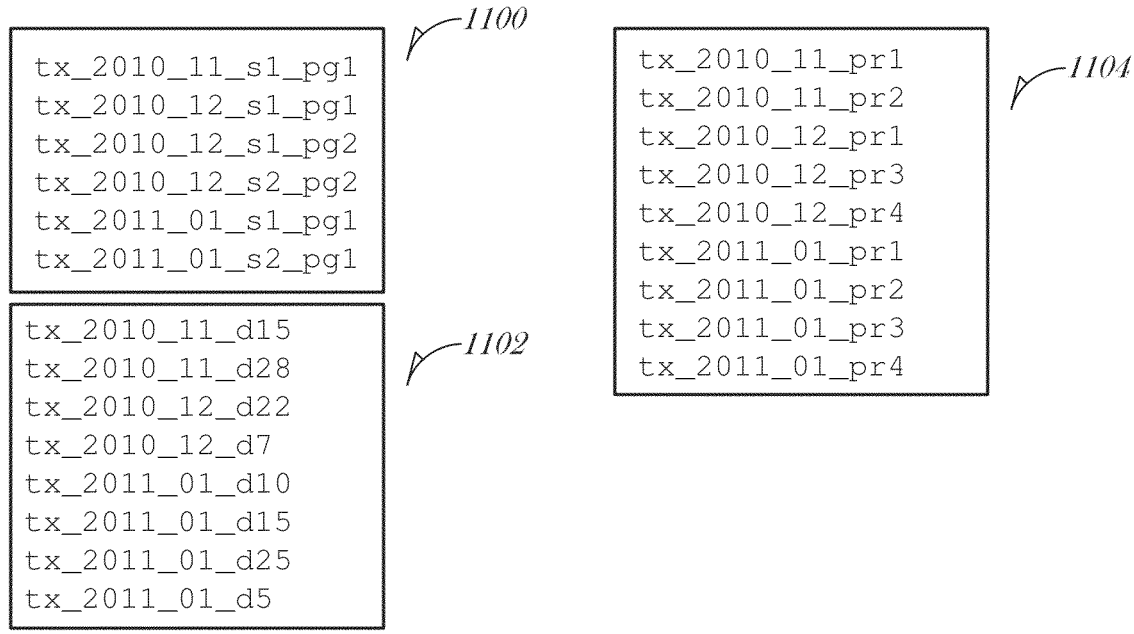
FIG. 11 illustrates the split data portions in the staging area derived from the data extraction files in FIG. 7, in accordance with various embodiments.
FIG. 12 illustrates the content of some of the split data portions illustrated in FIG. 11, in accordance with various embodiments.

FIG. 11 illustrates the split data portions in the staging area derived from the data extraction files in FIG. 7, in accordance with various embodiments. The split data portion filenames fall into three groups, labeled 1100, 1102, and 1104, with one group for each of the splitting schemes 900, 902, and 904. The files in 1100 are produced using splitting scheme 900 in the while-loop 1000 executed by the splitter script. Similarly, the files in 1102 are produced using splitting scheme 902, and the files in 1004 are produced using splitting scheme 904.

One of the split data portions in 1102 is "tx_2010_12_d7" produced by splitting scheme 902. The fact that the file name ends with the characters "d7" means that records inside the file have the value 7 in the "tx_dayom" column in the source dataset. In this instance, sales records for the 7th day of December 2010 are gathered into the split data portion "tx_2010_12_d7". This split data portion is later is loaded into table tx_2010_12_d7 in the target database.

Another of the split data portions in 1100 is named "tx_2010_11_s1_pg1". It can be seen from the filename and knowledge of the splitting scheme 900 that this file contains the sales data for year: 2010, month: 11, store ID: 1, and product group ID: 1. The splitting scheme provides a mechanism for standardizing filenames and incorporating metadata into these filenames. The splitting scheme also provide a mechanism for clustering records based on data values in those attributes of the source dataset, which are referenced in the splitting scheme expressions.

FIG. 12 illustrates the content of some of the split data portions illustrated in FIG. 11, in accordance with various embodiments. For example, file "tx_2010_12_d7" includes two lines, each of which contains the value '7' in the seventh field. These records are copies of the two first lines of extraction file 702.

As another example, the split data portion "tx_2011_01_s1_pg1" contains copies of the first two records from file 704, where the store_id is 1, the product_group_id is 1, the year is 2011, and the month is 1. As yet another example, the split data portion "tx_2011_01_s2_pg1" contains copies of the third and fourth records from file 704, where the store_id is 2 and product_group_id is 1.

Figure 13:
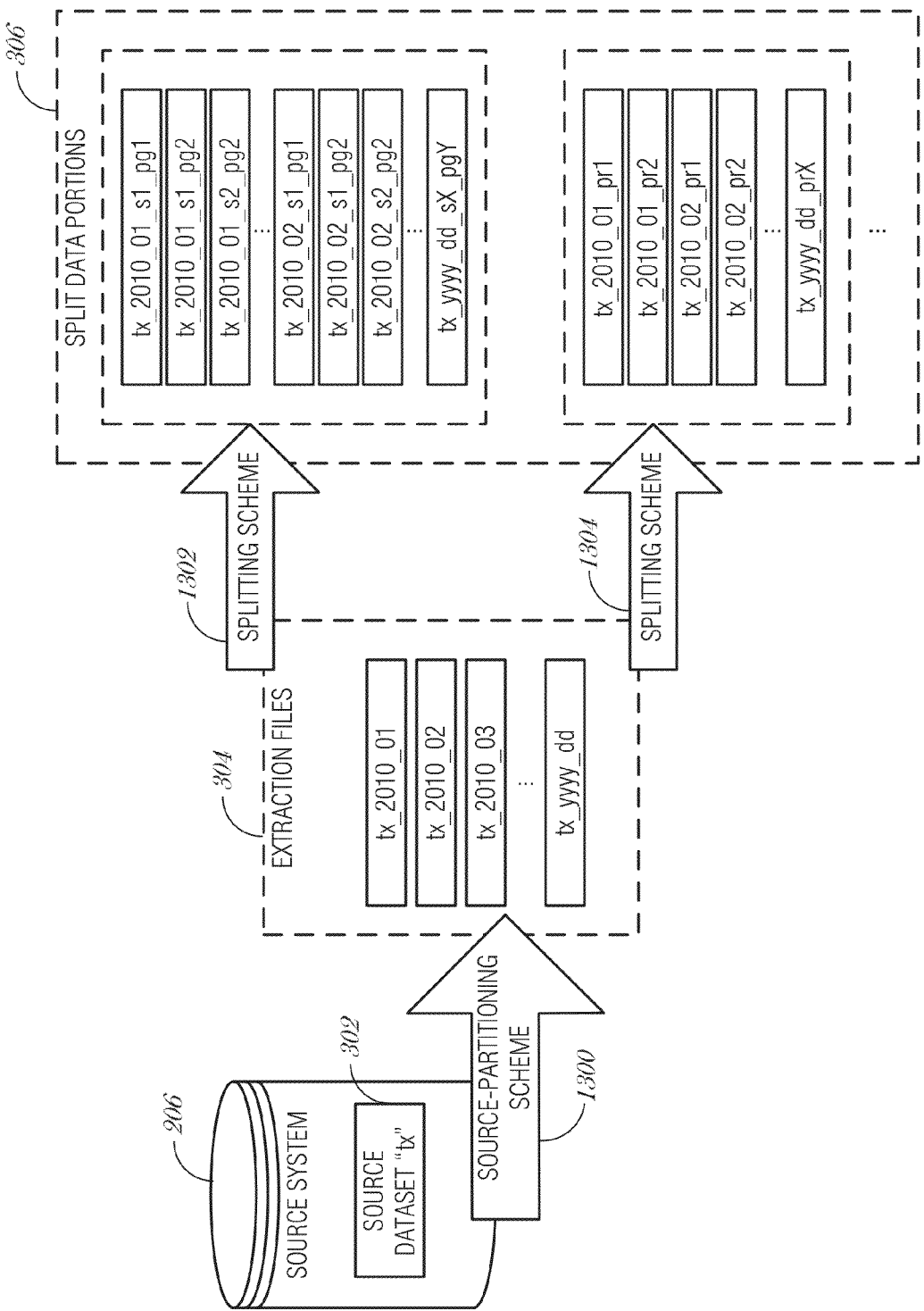
FIG. 13 is a schematic view illustrating the use of a naming convention, in accordance with various embodiments.

FIG. 13 is a schematic view illustrating the use of a naming convention, in accordance with various embodiments. FIG. 13 includes a source-partitioning scheme 1300 and two splitting schemes, 1302 and 1304. The source-partitioning scheme 1300 extracts data from the source dataset 302 at the source system 206. In this example, the source dataset 302 is named "tx". Extraction files 304 are created based on the source-partitioning scheme 1300 and follow the naming convention of using the year and month in the output data file (extraction files 304). Splitting scheme 1302 then splits each extraction file 304 into split data portions 306. For this example, splitting scheme 1302 uses splitting scheme 900, as illustrated in FIG. 9. As a result, split data portions 306 are generated using permutations of the values from the store_id and product_group_id fields. Similarly, splitting scheme 1304 may split extraction files 304 into split data portions 306, for example, using splitting scheme 904 (FIG. 9).

Loading Phase

Turning to the loading phase 204: as discussed with reference to FIG. 2, the loader program 222 has the means to receive split data portions and associate them with a load/summary template 226. The loader program 222 may then instantiate the template into an executable form and execute the template, thereby causing the split data portions to be loaded into tables in the target database 232. In an embodiment, the execution of the instantiated template causes summary tables specified in the template to be refreshed.

The loader program 222 may load data into preexisting tables or create tables as needed. In an embodiment, the names of the target tables are based on the filenames of the split data portions. This maintains a consistent naming convention throughout the extraction-splitting-loading process.

FIG. 14 is a code listing illustrating the loader program 222, in accordance with various embodiments. The first line moves files to the loading staging area 220, here embodied by the directory "stage/loadfiles". The second line invokes the template expander 224 with a parameter indicating the split data portion directory. In this example, the loader program 222 passes the output from the template expander 224 to a tool provided by the target database 232, which interprets the commands produced by the template expander 224. This is performed with the pipe operation that redirects output from the template_expand.pl executable file to the "sql_tool.shl" shell script. In the third line, the loader program 222 moves the loaded split data portions to the load file archive 230, here embodied by the directory "stage/loadfile_archive".

FIG. 15 is a code listing illustrating matching rules for the loader program 222, in accordance with various embodiments. In particular, the rules, written in the Perl programming language, define a list of hashes where each hash has a regular expression and an associated load/summary template filename. The exemplary rules in FIG. 15 include three matching rules 1500, 1502, and 1504. These rules may be configured by the database administrator or other user so that the template expander 224 can associate a load/summary template 226 with a particular split data portion being processed.

The rule labeled 1500 contains a regular expression that matches split data portion filenames generated by the splitting scheme 900, and associates those files to the load/summary template "templates/tx.tmpl". This is further illustrated in FIGS. 18-19.

The rule labeled 1502 similarly associates split data portions generated by the splitting scheme 902 to the same load/summary template "templates/tx.tmpl". Thus, in various embodiments, split data portions (e.g., files) generated by different splitting schemes may share the same load/summary template.

The rule labeled 1504 associates split data portions generated from splitting scheme 904 to a different load/summary template named "templates/tx_pr.tmpl". This is further illustrated in FIGS. 20-21.

FIG. 16 is a code listing illustrating a portion of the template expander 224, in accordance with various embodiments. The step of expanding the templates and printing to standard output is performed in a loop labeled "MATCH_RULE:" in the call to subroutine "expand_template" which is listed in FIG. 17.

FIG. 17 is a code listing illustrating a portion of the subroutines of the template expander 224, in accordance with various embodiments. The subroutine expand_template reads a load/summary template 226 into memory, constructs a temporary table name by adding a "z" to a target table name, replaces all instances of "#TABLE#" placeholder tags with the temporary table name and all "#FILE#" placeholder tags with the load filename, and prints the transformed template to standard output.

The expand_template subroutine constructs a swap script for both the base table and any summary table encountered in the template. In this embodiment, building the swap script is implemented by looping over "DROP" commands in the template with pattern matching. For each matched DROP command, a table name string is constructed, which includes pre-fixed and post-fixed characters around the #TABLE# tag as part of the table name string, thus matching both the basis table and any summary tables that may be present in the template.

The next step is to construct two variables, one holding the real target table name (or summary table name) and another holding the temporary table name. These table names are used to build commands to drop the target table (or summary table) and rename the temporary table to the target table name, thereby refreshing the target table. After building the swap script, the expand_template subroutine prints the script to the standard output.

FIG. 18 is a code listing illustrating a load/summary template 1800, in accordance with various embodiments. In this example, the load/summary template 1800 is "tx.tmpl", as referred to by matching rules 1500 and 1502. The load/summary template includes three commands: a drop command 1802, a create command 1804, and a load command 1806.

The drop command 1802 is configured to drop the table to be refreshed. The drop command 1802 includes a special tag "#TABLE#", which refers to the table to be dropped.

The create command 1804 creates a table referred to with the "#TABLE#" tag. The load command 1806 loads the split data portion (identified by the "#FILE#" tag) into the newly created table. This load/summary template 1800 may contain any number of additional statements supported by the target database tool, as desired by the software engineer.

When expanding the template 1800, the template expander 224 recognizes the characters "#TABLE#" as a special tag and replaces this tag with a target table name. In an embodiment, the template expander 224 derives the target table name from the split data portion filename. One mechanism to do this is to use the base name of the split data portion directly as the table name. This is the approach illustrated in this example. Using this approach avoids the use of metadata or other programmatic structures.

When expanding the template 1800, the template expander also recognizes the characters "#FILE#" as a special tag and replaces this tag with the full filename of the split data portion used for the template expansion. In an embodiment, the template expander replaces the string "#TABLE#" with the target table name and the string "#FILE#" with the split data portion filename. In another embodiment, the string "#TABLE#" is replaced with a table name for a temporary table, which is then renamed to the actual target table name. The temporary table is useful to reduce the amount of unavailability of the contents of the target table. Thus, in such an embodiment, the template expander 224 replaces "#TABLE#" with the target table name concatenated with an arbitrary string, such as "-temp", ".tmp", or "z".

As a result of the operation of the template expander 224, a load/summary script is produced. The load/summary script is a text file that contains executable statements to act upon the target database. In an embodiment, the target database includes an interface or other utility that executes statements included in the load/summary script. In another embodiment, a program is used to interface with the target database and provide the executable statements to the database to execute in the database.

In the current example, a target database tool accepts, among others, the following commands: "drop table", "create table", and "alter table". The target database tool also supports bulk loading of flat files using a "load data" command.

FIG. 19 is a code listing illustrating a load/summary script 1900, in accordance with various embodiments. The load/summary script 1900 is generated from the template 1800 of FIG. 18 after it has been expanded by the template expander 224. In the current example, the output of the template expander 224 is redirected to the database tool directly. In other examples, the output of the template expander 224 may be saved to a file, which may then be used to execute or process the database commands. Thus, while this description discussed a load/summary script in FIG. 19, it is understood that a physical manifestation of the output (e.g., storage on non-volatile media as a file) may not actually be produced by the template expander 224.

In this example, the #TABLE# tag was replaced with the target table name followed by the letter "z". In addition, the load/summary script 1900 includes a swap section 1902, where the target table is dropped and the temporary table is renamed to the target table. The commands in the swap section 1902 are not present in the template 1800, but are added by the template expander 224.

Another alteration in the load/summary script 1900 is the DROP TABLE command 1904. In various embodiments, the template expander 224 detects the capabilities of the target RDBMS and revises the DROP TABLE command of the template with a DROP TABLE command 1904 if the RDBMS supports a "drop table if exists" syntax.

As discussed above with respect to FIGS. 2 and 3, the loader program 222 creates and manages both target tables 308 and summary tables 310 in the target database 232. FIGS. 18 and 19 illustrated a template 1800 and its output (load/ summary script 1900). FIGS. 20 and 21 illustrate a template for a summary table and its use.

FIG. 20 is a code listing illustrating a load/summary template 2000, in accordance with various embodiments. Portions of template 2000 are similar to that of template 1800, in particular, the DROP, CREATE, and LOAD commands for the target table. However, the template 2000 in FIG. 20 also includes DROP, CREATE, and INSERT commands for a summary table, as defined in the summary section 2002.

A load/summary template can have any number of such derived summary tables. Summary tables may also be derived from other summary tables, so long that the sequence is such that derived tables only refer to previously defined tables. For instance, there may be first-level summary tables, second-level summary tables, and so on.

Summary tables may be created in a load/summary template using any valid SQL statement supported by the target RDBMS. Further, summary tables need not include summations; instead, they may include other clauses to summarize, aggregate, group, filter, or otherwise manipulate data.

FIG. 21 is a code listing illustrating a load/summary script 2100, in accordance with various embodiments. The load/summary script 2100 is the output from the template expander 224 based on the template in FIG. 20. The swap section 2102 includes DROP and ALTER commands to drop and rename all tables generated based on the template 2000 for split data portion "tx_2010_12_pr1". Note that both the basis table swap and the summary table swap are postponed until the end. This is to keep the basis tables and the summary tables consistent by not being published until the end of the load/summary script 2100.

In summary, the loader program 222 loads data from split data portions 306 into target tables 308, the names of which are derived from the split data portions. Other embodiments may utilize a metadata repository, a data dictionary, or other means to map split data portions to target table names or target partition names. The loader program 222 then generates summary tables 310 after loading the split data portions 306, and does so in a manner that does not expose data to client applications before both the base table and all dependent summary tables are populated and ready for use. In an embodiment, the loader program 222 performs its duties by employing load/summary templates 226, which are created and maintained by a database designer or software engineer. The load/summary templates 226 are expanded using the template expander 224 and passed to an RDBMS tool causing the tables and summary tables to be refreshed. The same template may be reused for all data files for which the template is intended. The template expander 224 identifies a template by employing pattern matching rules using matching rules 228 until a match is found, thus identifying the appropriate load/summary template 226 to be used.

Alternative Implementations

While example implementation illustrated in FIGS. 5-21 use flat files on disk, it is understood that some embodiments may be fully or partially implemented in a database or RDBMS. In an embodiment, the splitter program is embedded within an RDBMS, and the splitting schemes and splitter configuration are stored in the database via an extension to SQL syntax. Splitting schemes may be created on tables using a similar syntax as when creating table triggers. For example, in order to create the splitting schemes illustrated in FIG. 9, commands may be issued to the RDBMS as illustrated in FIG. 22.

In the embodiment illustrated in FIG. 22, a table is first created and marked for special treatment using the clause enable storage using splitting schemes in order to instruct the RDBMS to treat this table in a special way according to this disclosure (exemplary statement (1)).

The exemplary statement (2) alter table TX add splitting scheme part_by_month 'tx_'||to_char(tx_year)||'_'||to_char(tx_month) defines a splitting scheme for the table based on an expression 'tx_'||to_char(tx_year)||'_'||to_char(tx_month) which corresponds to the source-partitioning scheme in FIG. 4 at line 17. In some embodiments, the RDBMS will generate separate tables for each partition and in some embodiments, the partitions will not be visible as tables.

In some embodiments, the splitting schemes can be referenced in the definition of other splitting schemes, thereby allowing a tree structure of splitting schemes to be defined. Examples of this is included the statement (3) alter table TX add splitting scheme split_sheme_$900$ $_{part\_}$by_month||'_'||'s'||store_id||'_pg'||product_group_id where part_by_month is the name of the previously defined splitting scheme. The expression includes part_by_month and produces the same table names as the splitting scheme 900 by resolving the splitting scheme name to an actual table name generated by the splitting scheme in statement (2).

Similarly, statement (4) alter table TX add splitting scheme split_scheme_$902$ $_{part\_}$by_month||'_'||tx_dayom; corresponds to the splitting scheme 902, and statement (5) alter table TX add splitting scheme split_scheme_$904$ $_{part\_}$by_month||'_'||'pr'||product_id; corresponds to the splitting scheme 904.

The statements (6) create or replace summary template summary_2002 on table TX for split_sheme_904 . . . corresponds to another implementation for the summary template 2000 in FIG. 20. Summary templates in this embodiment are named objects associated with a named splitting scheme. In the example illustrated in FIG. 22, the summary template is named "summary_2000" and the syntax "on table TX for split_scheme_904" associates the summary template with a specific splitting scheme created in statement (5) FIG. 22. The RDBMS has the means to expand and execute the templates when necessary to generate and refresh the summary tables in a similar manner as described above.

In some embodiments, the details and complexities of data handling are hidden within the RDBMS. In various embodiments, there is no need for an explicit load template because the structure of the table, which "owns" the splitting scheme, is used as a template for creating the basis level split tables. Continuing with reference to FIG. 22, the statement (7) load data infile 'filename' into table TX; has different semantics when the target table uses splitting schemes. Instead of a normal insert, the insert activates the splitting schemes associated with the table, refreshes all the internal partitions associated with the data received, and automatically creates new partitions when necessary. Furthermore, dependent summary partitions are refreshed if they rely on the incoming data.

The statement (8) insert into TX select * from tx_lines where tx_year=2010 and tx_month=12; would similarly invoke changed semantics when the target table uses splitting schemes. The statement may create or refresh partitions associated with year 2010 and month 12. Repeated execution of the same statement with the same data would not change the content of the TX table.

Augmented SQL syntax for refreshing tables using splitting schemes is added in some embodiments. In some embodiments, the SQL syntax includes a "replace" keyword, which is used instead of "insert". In some embodiments, the phrase "or replace" is added after the insert as illustrated here:

replace into TX select * from tx_lines where tx_year=2010 and here: insert or replace into TX select * from tx_lines where tx_year=2010 and tx_month=12;. It is understood that other combinations and modifications may be available and used dependent on the capabilities of the underlying RDBMS.

In various embodiments, the partition-defining expression may be defined utilizing one or more simple functions, such as substring or modulus functions. One example of using a substring to partition a table is to specify a partitioning expression designating a specified number of characters from the start of an attribute, (for example the first character of a "last name" attribute).

The modulus function may also be utilized. For example, modulus of customer identification is one example of a partitioning expression that may improve performance of a table containing customer transactions. For example, in an ERP application having an account receivables module, a table may exist for recording customer payment schedules. The ERP software may not utilize partitions for this table because of the administrative burden, which cannot be placed on the customer. However, if an automatic expression-based partitioning option were implemented in relational database software, the ERP vendor may specify a partitioning scheme without burdening the customers with unacceptable database administration overhead. For the payment schedule table in this particular example, the ERP vendor may specify partitions based on some suitable partitioning expression. A suitable partitioning expression in this case may be "to_char (due_date, 'YYYY')||to_char(mod(customer_id,100))", thus creating a maximum of 100 new partitions each year and clustering payment schedules for the same customer for the same year in the same partition. Such partitioning may increase the clustering factor for an index on the customer identification attribute. Any query that accessed the payment schedules using an index access path based on an index involving the customer ID would benefit from an increased row hit ratio and the index would have a better "clustering factor". In sum, the benefits of partitioning may be easily distributed to non-expert customers because the correct kind of partitioning may be shipped with standard ERP software solutions to the end customer without adding administrative overhead of managing partitioned tables.

Expressions used to define partitions provide a database developer or administrator with a powerful tool for creating flexible, fine-grained, multi-dimensional partitioning schemes. If the developer or administrator wanted one partition for each month, one possible partition-generating expression may be 'sales_'||to_char(sales_date,'YYYYMM'). This expression would generate a different value for each month, thus specifying a different partition for each month. To accomplish the same in prior art would require the database administrator to issue a new "alter table add partition" command for each new month as needed. This limitation of prior art partitioning may explain why partitioning of tables is usually not used in packaged applications such as standardized ERP applications.

In another embodiment, dynamic partitioning is used to create a partitioned table. In this embodiment, partitions may be specified using an expression. The expression specifies one or more partitions to be created on an as-needed basis. FIG. 23 is a code listing illustrating examples of syntax used to create dynamic partitions by expression, in accordance with various embodiments. After a table is created, for example, by using one of the expressions in FIG. 23, the table acts like a regular table until an INSERT command. When a record is inserted into a table created with a dynamic partition expression, the RDBMS evaluates the dynamic partition expression to identify the partition described, and then determines whether the partition is present. If the partition is not present, then the partition is created, and the record is inserted into the newly created partition. If the partition already exists, then a record is inserted into the partition based on the expression. In a further embodiment, an expression that declaratively specifies a partition using an expression referring to one or more columns in the dynamic partition table, may return a character string, which may be used to name the partition. In various embodiments, use of dynamic partitions avoids having to implement staging areas.

Discussion of Partitioning and Design Considerations

The use of partitioning reduces the need for disk reads when partitions can be eliminated from consideration. On the other hand, if no partitions can be excluded from consideration, then almost no performance benefit of partitioning is realized.

If, for example, a table of people is partitioned on birth date and a query for a specific first name, for example 'Mary', is received, no performance benefits may be realized from the partitioning, because the query restriction does not match the partitioning. On the other hand, if the partitioning of the table was on the first name, the partitioning would benefit the query because 'Mary' would only be in a specific partition and all other partitions could be eliminated from consideration.

Let "row hit ratio" denote the ratio between the number of rows matched by a query and the total number of rows scanned in a table while executing the query. Partitioning a table is considered to increase query performance when the overall "row hit ratio" increases.

In many cases, the administrator or engineer decides how to partition data. This is done by considering the effects of various possible partitioning schemes in comparison to the performance of queries. Partitioning expressions should be selected to cluster related data together in order to increase the "row hit ratio" for as many different queries as possible. This takes some insight into the nature of the dataset and the nature of the queries. Often the dataset can roughly be organized into a small number of dimensions. To illustrate, for a retailer's fact table, the dimensions of the sales fact table dataset can often be grouped into one or more "where" dimensions, one or more "when" dimensions, and one or more "what" dimensions. The partitioning on a "when" dimension with some granularity combined with partitioning on a "what" dimension and a "where" dimension yields a clustering of data that makes the most sense for queries that are restricted with regard to those dimensions. For example, a query restricted to a single month and a single store and single product group may only have to visit a single partition of the data.

The underlying idea is to design partitions in order to cluster the data rows together that are likely to be queried together. Another consideration to take into account is to limit the number of generated partitions. In general, generating more partitions than what is needed to provide good performance creates overhead because multiple queries may need to be executed in order to gather data. The designer may decide that partitioning on product group modulus one hundred might be more appropriate. This would limit the number of partitions. The store id modulus one hundred could also be used yielding 100×100 combinations for clustering data that are related with regard to store and product group. Often several dimensions in a fact table are highly correlated with each other. For example, product and product group are highly correlated. An inquiry that is limited on product may take advantage of partitioning that involves a product group. This illustrates that partitioning on some expression (e.g., product group modulus 100) may also benefit queries that restrict on a correlated attribute (e.g., product id).

Some advocate removing foreign keys from the fact table and replacing them with a replacement value representing a combination of multiple foreign keys. This mechanism saves space in the fact table. The present disclosure does not take this approach. Instead, the present disclosure seeks to maintain foreign keys and eliminate joins. In various embodiments, a fact table contains as many foreign keys as necessary in order to serve multiple different restrictions "where" clauses without joins. It is often beneficial to go so far as to include additional redundant foreign keys in a fact table in order to eliminate joins. This may also facilitate join-less generation of summary tables, where the generation uses redundant foreign keys in a "group by" clause when generating the summary table.

In the present disclosure, summary tables are relatively small as a direct result of the previous partitioning of data into small basis fact tables. The methods the developer employs when designing the partitioning schemes and the summaries to configure for the present disclosure will vary from developer to developer depending on skills, experience and understanding of the dataset, the type of queries to be served and other issues involved. Some additional considerations are provided in the following examples.

One feature of the disclosed system is that it may work well without the use of indexes on the basic fact tables. Indexes may generally improve read performance by reducing the number of disk reads necessary to process a query. A table may have multiple indexes. Each index indexes one or more columns in a table. If a query is restricted on an indexed column, a database query optimizer may use the index for an indexed access path. The performance of an indexed access path on a table is strongly dependent on the resulting number of input/output (I/O) operations needed, which is dependent on the number of indexes and table database blocks that need to be fetched in order to process the query.

For a query that is not restricted on any indexed columns, the database may process the query without the benefit of any of the indexes and instead resorts to a full table scan, which is a sequential read of an entire table and usually represents a worst-case query performance on the table. The performance of the full table scan is largely determined by the size of the table and not dependent on restrictions present in the where clause of a query, thus the performance of a full table scan is generally predictable.

In some cases, a full table scan may be faster than an indexed access path. Whether an indexed access path or a full table scan is faster largely depends on the number of I/O operations needed to execute the query. If the data needed is scattered about numerous portions of the table's physical storage blocks, an indexed access path may result in as many read operations as is needed for a full table scan. Furthermore, the indexed access path has the disadvantage of causing random access disk reads that cannot take advantage of predictive read ahead in the storage subsystem. The indexed access path reads both from the index and from the table, whereas the full table scan only reads from the table. The full table scans benefit from predictive read ahead in the storage subsystem. These features skew the resulting performance more towards the full table scan than most people might think. Overall, there is a break even at some point between the performances of full table scan versus indexed access path.

An important factor for indexed access is the percentage of database blocks fetched, and an important factor determining the percentage of database blocks fetched is how the rows matching the query are physically distributed in storage. For example, in a retail sales table, the rows are inserted in approximately the order in which sales were made. Thus, records for a specific time interval tend to be clustered physically close together on the disk storage medium. As a result, a query that is selective on the date dimension and restricted to say a time interval corresponding to 3% of the total time interval available in the table might translate to about 3% of the disk blocks in the table.

Consider a query that is restricted to one product group that represents 3% of the total number of sales. Sales records for the product group tend to be approximately evenly distributed across the table because customers have no particular tendency to buy the products from the product group at particular times rather than other times. If, for example, there was, on average, 100 records in each database block, there will be, on average, 3% of 100, or three records in each database block related to this product group assuming that sales records for the product group are distributed across database blocks in a relatively uniform manner. This leads to a high probability of finding at least one record from the product group in each database block of the table. A very large portion (statistically about 93%) of the database blocks of the table need to be accessed in order to satisfy the query to yield only 3% of the rows.

Let the density of a query denote the average percentage of rows in a database block that satisfies a query for those database blocks needed for the query; then the average density of a restriction for the product group is 3%.

In cases such as the above-mentioned, the database administrator might create an index on the product group, but it would not improve performance because the indexed access path would access almost as many database blocks as the full table scan and would probably be slower than the full table scan due to the effects previously mentioned.

This example illustrates one reason for slow query performance that is not widely recognized. The underlying problem can be referred to as non-advantageous physical data distribution in the table resulting in low-density queries.

The current disclosure advocates a solution to this non-advantageous physical data distribution problem by using one or more appropriate splitting schemes in order to obtain an advantageous physical data distribution and thus enable high-density queries.

Prior art data warehouses have not systematically utilized partitioning for performance gains. Prior art partitioning is almost exclusively used on the date dimension. Consider the effects of traditional date based range partitioning in the context of the example above. Partitioning the table on date does not help with regard to the non-advantageous physical data distribution problem. A query restricted to the product group as mentioned in the example above would still be a low-density query (3% in the example) even after a traditional range-based partitioning has been used on the date-time dimension.

An advantageous physical data distribution with regard to product group may however be obtained by employing a partitioning based on the product group. The developer might consider creating a partitioning scheme that is a combination of month and product group id. Then there would be separate partitions created for each product group and month.

Now consider the effects this has on the physical data distribution with regard to product group. The effect would be that the density of records for a particular product group would change dramatically. In each partition of the partitioned tables, the density of a specific product group would be either 0% or 100%.

Consider what effects this has on query performance for a query that is restricted to a product group. The query now can be processed by visiting only the 3% of the partitions for the product group and eliminating all other partitions from consideration. Instead of reading 100% of data (assuming the RDBMS chooses a full table scan over an index scan), only 3% of the data needs to be read and a performance improvement of factor thirty-three is to be expected in this case. The improvement in performance comes without using indexes and by only using partitioning. Thus, it is illustrated that partitioning can be superior to indexing as a method to locate data.

The performance benefits are strongly dependent on an intelligent query strategy that avoids visiting a partition that is not necessary in order to answer the query. If such an intelligent query strategy is employed, tremendous performance improvement is not just possible but also straightforward to achieve, (for example, by directing queries to the partitions containing the desired product group and avoiding directing the query to irrelevant partitions).

Consider now whether it would be advantageous to create an index on the product group column. Those skilled in the art will realize that now an index on the product group column does not add any benefit because the partitioning already identifies those database blocks where records for a product group reside, and thus an index does not add any new information, but merely adds overhead.

Thus, it is seen that an advantageous physical data distribution obtained with suitable partitioning can 1) dramatically increase query density and 2) reduce or eliminate the need for indexes on those columns that participate in the partitioning scheme.

Continuing the example above, consider a query that is restricted to a particular product id where the product is within the previously mentioned product group. Assume that this product represents 10% of total sales within the product group, and thus 10% of 3%=0.3% of total sales transactions (and thus records in the table).

Assuming 1) the fact table is not partitioned, 2) the records are evenly distributed across the table, and 3) there are on average 100 records in each database block, then the probability of at least one record for the product will be found in a database block is 26% and for a large table the product will be found in about 26% of the database blocks. Now consider whether it would be advantageous to have an index on the product id column in the large fact table in this case. The answer is probably no, because accessing 26% of the database blocks using the index may be slower than accessing the whole table using full table scan. In addition, the density of the query will be low in both cases.

Consider now the effects on data distribution when the table has been partitioned on the month and product group as in a previous example. Assume that the product belongs to one and only one product group. Then within the partitions of the product group, the density of the product within the relevant partitions would be 10% as compared to 0.3% in the overall table, because of the assumption that sales of the product represent 10% of the sales of the entire product group. Looking at the storage, for each block containing 100 rows, on average ten rows would belong to the product. Thus, the partitioning scheme on product group creates a more advantageous physical data distribution with regard to restrictions on the product. The correlation between the product group and the product causes the partitioning on product group to create a more advantageous physical data distribution for the product also.

Thus, the developer and database designer should utilize correlations between various attributes in a table in order to design those partitioning schemes and cause the most advantageous physical data distributions.

Continuing the example, consider how to achieve high performance and high-density queries restricted on a column with low correlation to the columns considered above. Assume that the fact table contains sales transactions from multiple similar retail stores, with each store selling the same products and product groups. The store identifier is a good example of a column that has low correlation to the product group and product columns. Because the store identifier has low correlation to the product group, a partitioning scheme on product group does not create a more advantageous physical data distribution with regard to store id.

In the present disclosure, the uncorrelated column/dimension may be advantageously included in an existing partitioning scheme, or alternatively, another partitioning scheme could be created that includes the uncorrelated column/dimension/attribute.

For example, assume a new additional partitioning scheme is created that is based on the dimensions year-month and store identifier. Assume that there are 1000 stores in the retail chain, each with similar sales volume and product mix. Then there would be 1000 partitions each month based on this particular partitioning scheme. The density of queries for a particular store would be increased from $1/1000=0.1\%$ to 100% by accessing the correct partitions and avoiding the non-relevant partitions. Additionally, the performance of queries restricted on a partition would be increased, and there would be no need for an index on store id.

Continuing the example, consider now a query that includes restriction on both store id and product group id. For this query, there are now two possible access strategies based on the two partitioning schemes previously discussed, and neither would be optimal.

The first approach is to pursue a query strategy based on the month and product-group partitioning-scheme. This would result in 0.1% density queries (assuming no indexes on store id) as only one in every 1000 records would be for the right store, and all records would be for the right product group. The other approach is to pursue a query strategy against the partitions based on the month-store partitioning-scheme. This would result in 3% density queries (assuming no indexes on product group) as 3% of the records would be in the right product group and 100% would be for the right store. Between these two approaches, the latter strategy is more efficient as it results in a thirty times higher density query (3% versus 0.1%).

It is possible to create a more advantageous physical data distribution with regard to queries that are restricted on both store id and product group by creating a three dimensional portioning scheme based on a combination of month, store id, and product group id. By utilizing this partitioning scheme on a query that is restricted on both product group id and store id, and directing the query to the relevant partitions, this would result in scanning only partitions where each record encountered would have the relevant store id and product group id; thus, query processing would be efficient.

A guideline to optimize performance is to aim to keep the size of each partition small enough to allow a computer platform to execute a full table scan of one partition in less than about 0.2 seconds when the data is not previously cached and about 0.05 seconds when data is previously cached. On some current platforms, this translates to about 50,000 records. If this guideline is followed, about 12 partitions may be accessed for an inquiry, and the worst-case performance would be 0.2*12=2.4 seconds for retrieving data for an inquiry, assuming no caching.

Another guideline is to seek to arrange data by using splitting schemes and load/summary templates so that most or all inquiries can be serviced by querying less than 20 partitions, with as few partitions as possible (preferably 2-4 for most inquiries). For example, if an application is found to visit more than a handful of partitions when responding to an inquiry, another splitting scheme may be in order to facilitate a better match between the needs of the application and the chosen data layout. In a related vein, if a specific type of inquiry cannot be serviced in less than 1-2 seconds, a new dataset may be prepared in order to better service the needs of that type of inquiry.

Another guideline is to pre-join information attributes to the fact datasets that are needed for display and/or restriction in the frontend application.

In sum, a rough design principle for selecting suitable partitioning schemes is to let the partitioning schemes conform to the multi-dimensional structure of the dataset. If the dataset can naturally be decomposed into an N-dimensional grid, then using an N-dimensional splitting scheme may result in a near optimal query performance for inquiries restricted on all N dimensions. For additional efficiencies, one or more lower dimensional "slices" may be used to better serve inquiries that are not restricted on all dimensions.

Summary Table Performance

Traditionally, in prior art data warehouses, summary tables (of fact tables) have been created as materialized queries against huge fact tables stored in a normal table. In contrast, the present disclosure advocates for an integrated approach where summaries are closely coupled to partitioning schemes. Thus, summary tables are not created on the fact table directly, but instead are indirectly created on the small tables resulting from the splitting of a large fact table by one or more splitting schemes.

The creation and maintenance of the summary table of the current disclosure are declared in the load/summary templates and thus integrated in a refresh operation. A representation of a source dataset in the many small basis-level fact tables and many still smaller summary tables based directly and indirectly on those small basis level fact tables may be advantageous.

One common class of summary tables is created by selecting some of the table dimensions and leaving others out, and aggregating the numerical measures in the fact table and including the selected dimensions in the "group by" clause of the summary generating query.

There are several problems with this kind of summary table: 1) it is expensive to create and maintain, 2) it may still be too large and not perform fast enough for interactive purposes, 3) it may be "stale" and thus inconsistent with regard to the basic fact table, 4) it is global with respect to the fact table such that any changes made to the underling fact table usually will make the summary table inconsistent with the parent fact table, and 5) the table may not have any particular advantageous physical data distribution of rows.

Contrast this to the kind of summary tables described in the current application. The summary tables in the present disclosure are 1) not expensive to create and maintain because they are created by aggregating from a relatively small parent table, 2) the summary tables are small and often fast enough for interactive purposes, 3) the summary tables are never "stale" with respect to the parent fact table partition, 4) the summary tables are local with respect to the source fact table such that only changes that effect the parent fact table partition trigger a need to refresh the localize summary table, and 5) the summary tables automatically inherit a advantageous physical data distribution from the parent basis fact-partition created by the parent splitting scheme.

Methods Of Operation

Figure 24:
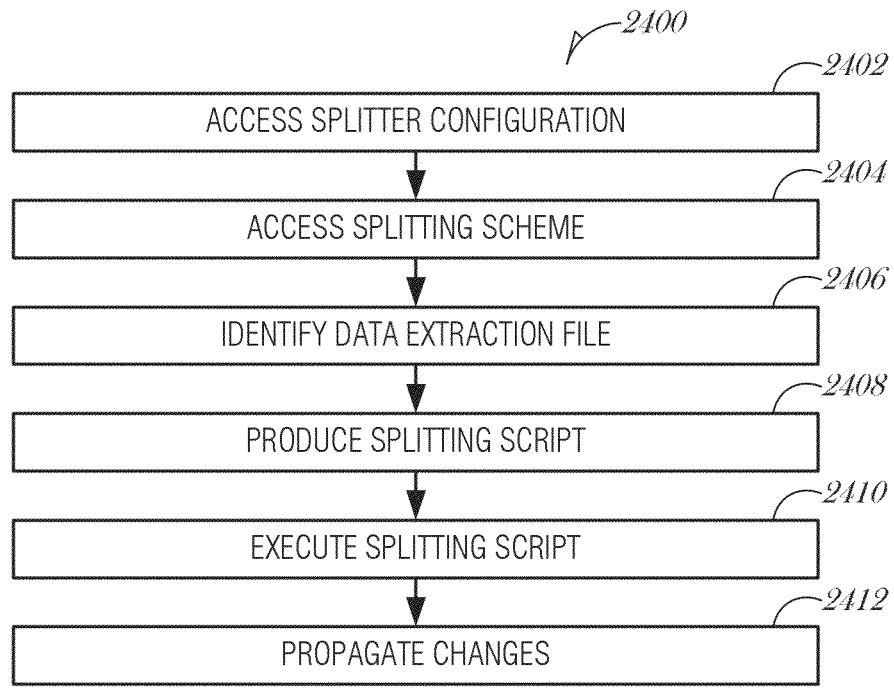
FIG. 24 is a flowchart illustrating a method of performing a splitting process to split an extraction file into several split data portions, in accordance with various embodiments.

FIG. 24 is a flowchart illustrating a method 2400 of performing a splitting process to split an extraction file into several split data portions, in accordance with various embodiments. At 2402, a splitter configuration is accessed. The splitter configuration may be in the form illustrated in FIG. 8 and include parameters to configure the splitting process. The parameters may be passed to the splitting operation, read from a file, or read from another data source, such as a database. Further, not all parameters need to be accessed in the same manner by the splitting process. Instead, for example, some parameters may be global environment variables, while others are read from a file and accessed from a database. In an embodiment, the splitter configuration identifies the splitting schemes, the location of extraction files, and a filename pattern. These parameters are discussed further with respect to steps 2404 and 2406.

At 2404, a splitting scheme is accessed. Similar to the splitter configuration, splitting schemes may be stored in a variety of places and accessed appropriately. In an embodiment, the location of a file containing splitting schemes is passed to the splitting process as a parameter. The splitting process may then access and read the splitting schemes contained in the file. Splitting schemes are discussed above with respect to FIG. 9, in addition to other places.

At 2406, a data extraction file is identified. In an embodiment, the splitter process gathers a list of data extraction files based on the extraction file location and the filename pattern specified by the splitter configuration. The file location and filename pattern parameters are used to limit and specify on which files to operate.

At 2408, a splitting script is produced. In the step of producing a splitting script, the splitting process processes the list of extraction files and for each extraction file, creates code for each of the splitting schemes accessed at 2404. The resulting splitting script includes a loop, for each combination of extraction file and splitting scheme where each of the produced loops splits one extraction file according to one splitting scheme.

At 2410, the splitting script is executed. The script produces one or more split data portions, each in accordance with a corresponding splitting scheme.

At 2412, changes are propagated. In order to avoid propagating split data portions that are unchanged between update cycles, the splitter process holds a copy of the split data portions in a staging cache area. When a split data portion is generated, it is compared against the previous version and only propagated if it is new or its content is different.

Figure 25:
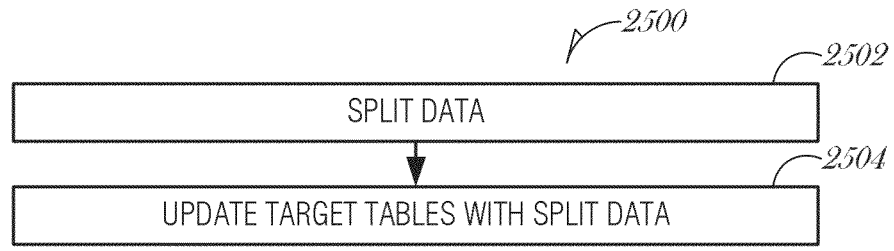
FIG. 25 is a flowchart illustrating another method of performing a splitting process to split an extraction file into several split data portions, in accordance with various embodiments.

FIG. 25 is a flowchart illustrating another method 2500 performing a splitting process to split an extraction file into several split data portions, in accordance with various embodiments. At 2502, data is split. In an embodiment, source data is split into a first set of split data portions based on a first attribute of the data and a second set of split data portions based on a second attribute of the data. The first set of split data portions may be configured to be a source of data for a first set of target tables. Similarly, the second set of split data portions may be configured to be a source of data for a second set of target tables. Each of the first and second sets of target tables may be created based on the splitting so that data within each set of tables includes data organized to serve a particular type of inquiry. The splitting may be performed without regard to whether the same data is in more than one target table of the first or second set of target tables.

In an embodiment, the data from the data source is extracted from a table, a view, a query, a set of records, or a tuple source, in accordance with the data mapping.

In an embodiment, substantially all data from the data source is contained within each of the first and second sets of target tables, but arranged differently in the first set of target tables than in the second set of target tables. "Substantially all data" may refer to the situation where all data from the data source is included in the first set of target tables and all data from the data source is included in the second set of target tables. Alternatively, "substantially all data" refers to a situation where most or a majority of data from the data source is included in the first set of target tables and most or a majority of data from the data source is included in the second set of target tables.

In an embodiment, each of the first and second attributes is selected based on a portion of an expected or likely query. Expected or likely queries may be determined by a database designer or programmer based on the design of the database, the use of the database, the type of users accessing the data in the database, or the type of queries observed during testing or other monitoring of the database. In an embodiment, the first attribute is related to a time dimension.

In an embodiment, the data source and the target tables are in the same database. In an alternative embodiment, the data source and the target tables are in different databases.

At 2504, target tables are updated with the split data. In an embodiment, a portion of the first set of split data portions is used to generate or update the first set of the target tables, and a portion of the second set of split data portions is used to generate or update the second set of the target tables.

In an embodiment, the splitting and using steps (2502 and 2504) are repeated to accommodate a new extraction of data from the data source that includes modified or added data in the data source, and wherein the using includes updating data in selected tables within the first and second sets of target tables to reflect the modified or added data in the data source.

In a further embodiment, the updating discards data in the selected tables and replaces the discarded data with data from corresponding split data portions from the repeated splitting.

In a further embodiment, the updating is performed via a full refresh operation.

In a further embodiment, the selected tables are chosen based on a comparison of: (1) first and second sets of split data portions from the splitting; and (2) first and second sets of split data portions from the repeated splitting. The comparison may be configured to detect the modification of data within the first and second sets of split data portions from the repeated splitting.

In a further embodiment, whether a summary table that is dependent on the selected table already exists is determined. Based on the determination, the summary table is conditionally created or updated.

In an embodiment, at least one template is utilized to generate custom instructions for generating or updating the first and second sets of target tables based on the first and second split data portions, with each of the at least one templates being customized for a subset of the first and second sets of split data portions. In an embodiment, a plurality of templates is utilized to generate custom instructions for generating or updating the first and second sets of target tables based on the first and second split data portions, with each of the plurality of templates being customized for a subset of the first and second sets of split data portions. It is understood that a single template may be used to generate custom instructions and that such a single template may be customized for the subset of the first and second sets of split data portions.

In an embodiment, names of the target tables are automatically generated in accordance with the data mapping, with the name of each of the target tables reflecting how the extracted data is split according to the first or second attribute. In a further embodiment, the names of the target tables reflect a range of data contained within the associated target table. In a further embodiment, the names of the target tables are used as part of a hash function to service an incoming inquiry.

In a further embodiment, a selection element of an incoming inquiry is matched against the names of the target tables to locate one or more target tables optimized to deliver data related to the incoming inquiry. One or more queries are generated to the one or more located target tables to produce a result for the incoming inquiry.

Figure 26:
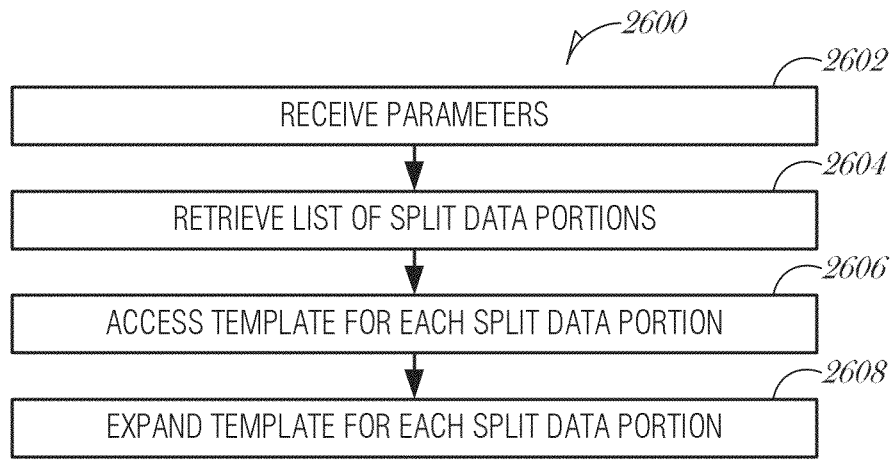
FIG. 26 is a flowchart illustrating a method of expanding a load template, in accordance with various embodiments.

FIG. 26 is a flowchart illustrating a method 2600 of expanding a load template, in accordance with various embodiments. At 2602, a parameter is received. In an embodiment, the template expander receives a directory name wherefrom split data portions are to be retrieved and, optionally, a regular expression for filtering the list of retrieved split data portions.

At 2604, a list of split data portions is retrieved. In an embodiment, split data portion filenames are retrieved from the indicated directory, and if a regular expression was received in step 2602, the list of files to be processed is filtered by matching the regular expression against retrieved split data portion filenames. If no regular expression was received in step 2602, the default behavior is to process all files contained in the directory indicated.

At 2606, a template is accessed for each split data portion. The association between a template and a split data portion may be specified, such as with a matching rules file, as illustrated in FIG. 15.

At 2608, the template for each split data portion is expanded. In an embodiment, placeholder tags are replaced in the template to create a set of database commands in an expanded template. An example of an expanded template is illustrated in FIG. 19.

In a further embodiment, the expanded template is communicated to standard output. For example, as illustrated in FIG. 14, the output of the template expander process is redirected to a database tool, which executes the database commands contained in the expanded template. In another embodiment, the expanded template is saved to a file, which may then be used to create the target tables and summary tables in the target database. In another embodiment, the template is expanded and processed within an RDBMS engine, such as by way of use of stored procedures.

Figure 27:
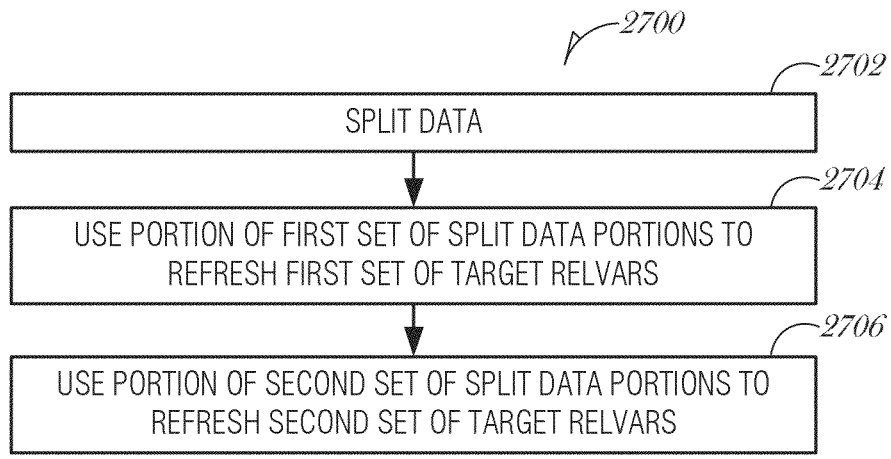
FIG. 27 is a flowchart illustrating a method of performing a splitting process to split an extraction file into several split data portions, in accordance with various embodiments.
Figure 28:
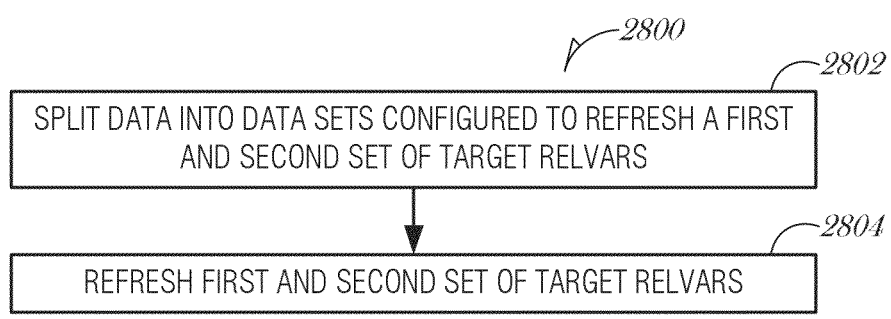
FIG. 28 is a flowchart illustrating a method of performing a splitting process to split an extraction file into several split data portions, in accordance with various embodiments.
Figure 29:
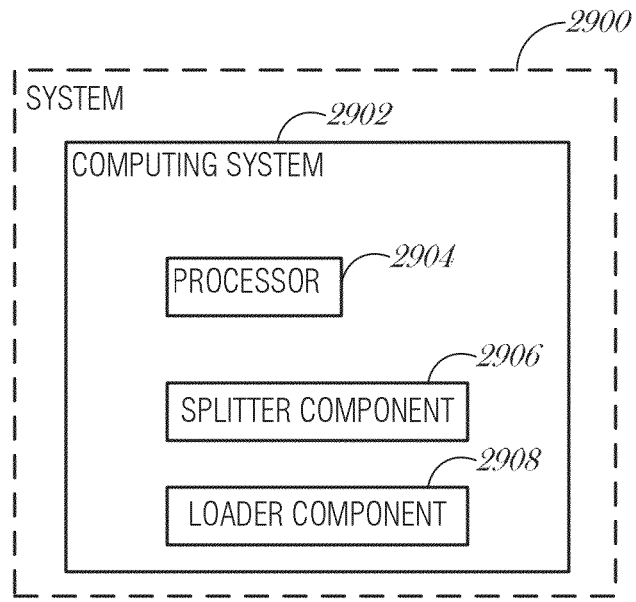
FIG. 29 is a block diagram illustrating a system to implement operations of the present disclosure, in accordance with various embodiments.

FIGS. 27-29 are discussed in terms of a relational model. As discussed above, a relational variable ("relvar") is a variable that has a relation value and is used to differentiate between a variable that contains a relation and the relation itself. When used in the context of this disclosure, it is understood that "relvar" may refer to a table, a partition, or any other structure able to hold tuples.

A relvar assignment may be exemplified as "target_relvar:='relation value';". Such an expression resembles a variable assignment in a programming language. Such expressions may be used to represent an underlying SQL data manipulation statement, such as an update, delete, or insert operation, or a combination of several operations. In various embodiments, the assignment operator ":=" has the behavior of creating the target relvar variable (e.g., table) as needed if the variable did not previously exist.

A relational table in a RDBMS is an implementation of a relvar. A SQL select statement produces a relation (e.g., dataset) that in principle can be assigned to a relvar (e.g., table). Database management systems that do not support relvar assignment operators leave the programmer to use SQL and implement the relvar assignment into one or more SQL statements that accomplish the same task as the expressed relvar assignment.

For example, the expression "summary_table:=summary (tx)" may be used where summary(tx) is a relvar function deriving a summary relvar ("summary_table") from the source relvar "tx". Expressed as SQL in pseudocode, this operation may appear as illustrated in Table 1.

TABLE 1

```
begin
    if exists "summary table" then
        DROP "summary table"
    end if;
    CREATE "summary table" . . . ;
    INSERT into "summary table" select . . . from tx where . . .
end;
```

FIG. 27 is a flowchart illustrating a method 2700 of performing a splitting process to split an extraction file into several split data portions, in accordance with various embodiments.

At 2702, data is split in accordance with a data mapping. In an embodiment, the data is split into a first set of split data portions and a second set of split data portions. In this embodiment, the first set of split data portions is based on a first attribute of the data, with the first set of split data portions configured to be a source of data for a first set of target relvars. Further, in this embodiment, the second set of split data portions is based on a second attribute of the data, with the second set of split data portions configured to be a source of data for a second set of target relvars. Each of the first and second sets of target relvars is created based on the splitting so that data within each set of relvars includes data organized to serve an inquiry restricted by at least one of: the first attribute or the second attribute. In addition, the splitting is performed without regard to whether the same data is in more than one target relvar of the first or second set of target relvars. The data of the data source is extracted from an n-ary relation value in accordance with the data mapping.

At 2704, a portion of the first set of split data portions is used to refresh the first set of target relvars. In a further embodiment, using the portion of the first set of split data portions to refresh the first set of target relvars comprises creating a relvar when the relvar does not exist in the first set of target relvars, and updating the relvar.

At 2706, a portion of the second set of split data portions is used to refresh the second set of target relvars. In an embodiment, a target relvar in the first and second sets of target relvars is a database table. In an embodiment, a target relvar in the first and second sets of target relvars is a partition of a database table. In an embodiment, the n-ary relation value comprises a table, a view, a query, a set of records, or a tuple source. In an embodiment, a majority of the data from the data source is contained within each of the first and second sets of target relvars, but arranged differently in the first set of target relvars than in the second set of target relvars. In a further embodiment, the majority of data from the data source comprises the entirety of the data source.

In a further embodiment, the splitting and using operations (2702, 2704, and 2706) are repeated to accommodate a new extraction of data from the data source to extract new data from the data source, and wherein the using operations include updating data within the first and second sets of target relvars to reflect the new data extracted from the data source. In an alternative embodiment, the updating comprises discarding data in the target relvars, and replacing the discarded data with data from corresponding split data portions from the repeated splitting. In an alternative embodiment, the updating comprises performing a full refresh operation.

In a further embodiment, the using operations (2704, 2706) comprise comparing the first set of split data portions from the splitting with the first set of split data portions from the repeated splitting to detect modification of data in the first set of split data portions from the repeated splitting. The using operations (2704, 2706) also comprise comparing the second set of split data portions from the splitting with the second set of split data portions from the repeated splitting to detect modification of data in the second set of split data portions from the repeated splitting. Modifications may be due to revisions to data in the data source, which are propagated to the split data portions. By comparing the split data portions of successive splitting operations, those split data portions that have not been modified may be omitted from reloading into the target relvars.

In a further embodiment, the using operations (2704, 2706) include refreshing a summary relvar that is dependent on the at least one relvar of the first and second sets of target relvars.

In an embodiment, each of the first and second attributes is selected based on a portion of a query likely to be used on the first and second target relvars, respectively.

In an embodiment, the data source and the target relvars are in the same database. In an alternative embodiment, the data source and the target relvars are in different databases.

In an embodiment, using the first and second split data portions to refresh the first and second set of target relvars includes utilizing a plurality of templates to generate instructions for refreshing the first and second sets of target relvars based on the respective first and second split data portions, with each of the plurality of templates customized for a subset of at least one of the first and second sets of split data portions. In an alternative embodiment, using the first and second split data portions to refresh the first and second set of target relvars includes utilizing a single template to generate instructions for refreshing the first and second sets of target relvars based on the respective first and second split data portions, with the single template being customized for a subset of at least one of the first and second sets of split data portions.

In an embodiment, the method 2700 includes automatically generating a name of a target relvar in accordance with the data mapping, with the target relvar associated with at least one of the first and second set of target relvars. In a further embodiment, the name of the target relvar reflects how the data is split. In another embodiment, the name of the target relvar reflects a range of data contained within the target relvar. In another embodiment, a name of a target relvar is used as part of a hash function to service an incoming inquiry. In another embodiment, a restriction element of an incoming inquiry is matched against names of target relvars in the first and second sets of target relvars to locate a target relvar configured to deliver data related to the incoming inquiry, and a query directed to the located target relvar is generated to produce a result for the incoming inquiry.

FIG. 28 is a flowchart illustrating a method 2800 of performing a splitting process to split an extraction file into several split data portions, in accordance with various embodiments.

At 2802, data extracted from a data source is split into a first set of data based on a first attribute of the extracted data and a second set of data based on a second attribute of the extracted data. In an embodiment, the first set of data is configured to be used to refresh a first set of target relvars, and the second set of data is configured to be used to refresh a second set of target relvars. Each of the first and second sets of target relvars is configured so that data within each set of relvars is organized to provide a response to an inquiry restricted by at least one of the first attribute or the second attribute.

In a further embodiment, data is extracted from the data source in accordance with a mapping that maps data from the data source to the first and second sets of target relvars.

In an embodiment, a first majority of the data is contained within the first set of target relvars, and a second majority of the data is contained within the second set of target relvars.

At 2804, the first set of data is used to refresh the first set of target relvars and the second set of data is used to refresh the second set of target relvars.

In a further embodiment, the split and use operations are repeated to accommodate new data contained in a new extraction from the data source as compared to the extracted data. In a further embodiment, a data update of the first and second sets of relvars is selectively performed to reflect the new data. In an embodiment, the data update is performed with a full refresh operation.

In a further embodiment, a data refresh of a summary relvar that is dependent on at least one relvar of the first and second sets of target relvars is performed, and upon the refresh of the at least one relvar of the first and second sets of target relvars.

In a further embodiment, a plurality of templates is utilized to refresh the first and second sets of target relvars. In an alternative embodiment, a single template is used to refresh the first and second sets of target relvars. In an embodiment, each of the templates is configured to be used in the generation of particular table generation or table update instructions for a subset of the sets of data. In an embodiment, names of split data portions are generated corresponding to the datasets according to one of the first and second attributes used in the splitting. In an embodiment, a template is selected based on an association of the name of a split data portion and the template.

In an embodiment, database instructions for refreshing a summary relvar are generated, where the summary relvar is related to at least one relvar in the first and second sets of target relvars. In an embodiment, database instructions are generated to create the at least one summary relvar upon creation of a target relvar from which the summary relvar depends, and to refresh the at least one summary relvar upon the refresh of a target relvar from which the summary relvar depends. In a further embodiment, the refreshed summary and target relvars are made available essentially simultaneously to a client application. While actual simultaneity may be practically impossible, "essentially simultaneously" is meant to be interpreted as having two events occur in a relatively short period. For example, in an operating database system, queries may be observed as occurring every 0.25 seconds. Having the refreshed summary and target relvars available with 0.20 seconds of each other appears to be simultaneous to the user. The reality of the situation is that a particular user may only query the database once every 30 seconds while browsing data. Hence, the time interval for that user may be quite a bit longer for the user to observe "simultaneous" availability of the summary and target relvars.

FIG. 29 is a block diagram illustrating a system 2900 to implement operations of the present disclosure, in accordance with various embodiments. In an embodiment, the system 2900 includes a computing system 2902, a processor 2904, a splitter component 2906, and a loader component 2908. The splitter component is configured to split data extracted from a data source into a first set of split data portions based on a first attribute of the extracted data, with the first set of split data portions configured to be used as a source for a first set of target relvars, and a second set of split data portions based on a second attribute of the extracted data, with the second set of split data portions configured to be used as a source for a second set of target relvars, where the second attribute is different from the first attribute. Further, data within each set of relvars is organized according to an inquiry restricted by at least one of: the first attribute or the second attribute. The loader component 2908 is configured to use the first and second split data portions to refresh a corresponding target relvar.

In an embodiment, the computing system 2902 includes an extraction component configured to generate the extracted data by selecting data from a tuple source in the data source in accordance with a mapping, wherein the mapping maps data from the data source to the plurality of relvars.

In an embodiment, the computing system 2902 includes a template expander component. The template expander component may be configured to access a plurality of parameters, identify a list of the split data portions to be used for relvar refresh operations, and for each of the split data portions to be used for relvar refresh operations: locate a template associated with the split data portion and generate, using the template and the plurality of parameters, a plurality of instructions to be used by the loader component for refreshing a target relvar of the first or second set of target relvars using the associated split data portion. In an embodiment, the first and second sets of target relvars are in a database that does not include the data source.

In an embodiment, the template expander component is further configured to generate, for at least one of the split data portions to be used for relvar refresh, instructions for generating dependent summary relvars to be used by the loader component.

In an embodiment, the template expander component is further configured to identify a template using the name of a split data portion.

In an embodiment, the loader component is further configured to utilize a bulk load procedure to load the first and second sets of split data portions.

In an embodiment, the splitter component is further configured to save the first and second sets of split data portions for comparison with sets of split data portions created by splitting a later set of extracted data from the data source.

In an embodiment, the computing system is further configured to compare the first and second split data portions with a previously saved version of the first and second sets of split data portions to identify modified split data portions, and propagate the modified split data portions to the load operation.

Hardware and Software Platform

Figure 30:
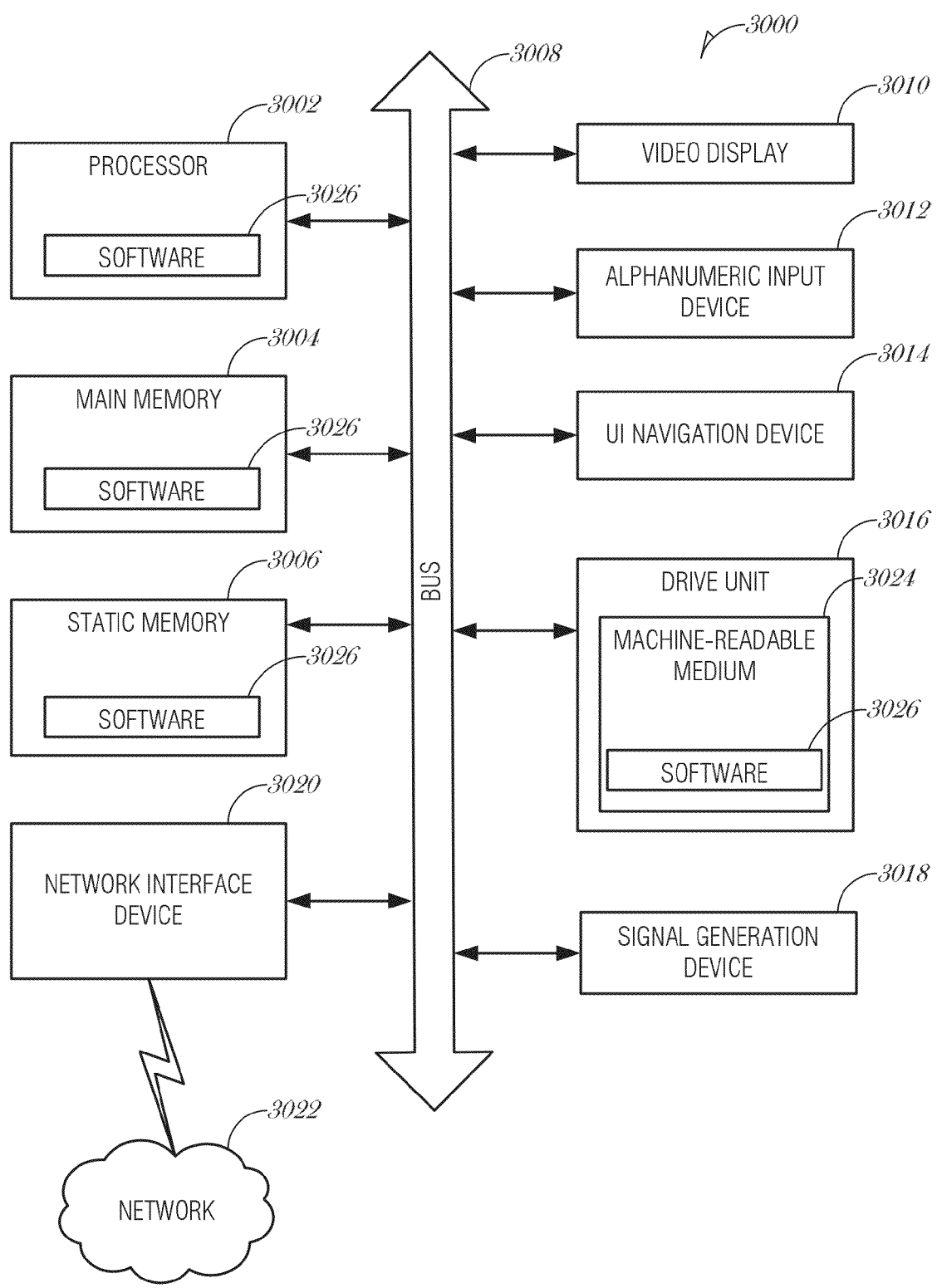
FIG. 30 is a block diagram illustrating a machine in the example form of a computer system, within which a set or sequence of instructions for causing the machine to perform any one of the methodologies discussed herein may be executed, according to various embodiments.

FIG. 30 is a block diagram illustrating a machine in the example form of a computer system 3000, within which a set or sequence of instructions for causing the machine to perform any one of the methodologies discussed herein may be executed, according to various embodiments. In various embodiments, the machine may comprise a computer, a network router, a network switch, a network bridge, Personal Digital Assistant (PDA), a cellular telephone, a web appliance, a kiosk, set-top box (STB) or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 3000 includes a processor 3002 (e.g., a central processing unit (CPU)), a main memory 3004 and a static memory 3006, which communicate via a bus 3008. The computer system 3000 may further include a video display unit 3010 (e.g., a liquid crystal display (LCD) or a cathode ray tube (CRT)). The computer system 3000 also includes an alphanumeric input device 3012 (e.g., a keyboard), a user interface navigation device 3014 (e.g., a mouse), a disk drive unit 3016, a signal generation device 3018 (e.g., a speaker) and a network interface device 3020 to interface the computer system 3000 to a network 3022.

The disk drive unit 3016 includes a machine-readable medium 3024 on which is stored a set of instructions or software 3026 embodying any one, or all, of the methodologies described herein. The software 3026 is also shown to reside, completely or at least partially, within the main memory 3004, static memory 3006, and/or within the processor 3002. The software 3026 may further be transmitted or received via the network interface device 3020.

While the computer system 3000 is shown with a processor 3002, it is understood that the systems and methods described herein can be implemented on one or more processors on one or more computer systems, including but not limited to a multi-processor computer (e.g., two or more separate processors or two or more cores in a single processor), a multi-computer system (e.g., a distributed computing environment), or a mixture of single-processor and multi-processor computers in a distributed fashion.

For the purposes of this specification, the term "machine-readable medium" or "computer-readable medium" shall be taken to include any tangible non-transitory medium which is capable of storing or encoding a sequence of instructions for execution by the machine and that cause the machine to perform any one of the methodologies described herein. The terms "machine-readable medium" or "computer-readable medium" shall accordingly be taken to include, but not be limited to, solid-state memories, and optical or magnetic disks. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Conclusion

The present disclosure introduces a system to increase query performance, increase data warehouse load performance, and provide an interactive database experience. One mechanism to provide such advantages includes removing reliance on a large fact table by introducing splitting schemes that automatically create tables or table partitions. The tables conform to a naming convention, which provides additional efficiencies and transparency to the process. Further efficiency is gained by use of a staging area, which avoids unnecessary table refresh operations by comparing new staging area files with previous versions of similar staging area files and only propagating new data to the target database. In addition, the present disclosure introduces templates for loading target tables and summary tables. Such templates may be incorporated and implemented in an RDBMS. Load templates may be implicitly derived from a source dataset definition.

In various embodiments, the data from a source dataset is extracted according to a source-partitioning scheme. This is done to minimize impact on the source system so that the extract-transform-load cycle can be executed repeatedly with minimal effect on the source system. Target partitions may be created using more than one dimension, such as illustrated above where two dimensions are used (product and store), or three dimensions are used (product, store, and month and year). It is understood that more than three dimensions may be used to create partitions.

The data is then split into multiple files by the splitter program, which is an efficient operation, thus producing one split data portion for each target table. Each split data portion is relatively small compared to the source dataset and each split data portion clusters data from the source dataset physically in a way determined to be advantageous by the software engineer. Splitting may be performed using one or more attributes (e.g., columns) of a record. Splitting was illustrated above using two attributes (store_id and product_group_id). It is understood that more than two attributes may be used to create split data portions.

The data is then loaded by the loader program, which loads each file into a newly created temporary target table utilizing a bulk load of the target RDBMS. This is also a high-speed operation because data is loaded into an empty table with no indexes.

After the split data portion has been loaded into a temporary target table, temporary summary tables are created using data from the just-loaded temporary basis target table. These summary tables are populated using bulk SQL commands. This is also a fast operation of selecting from newly loaded data into an empty table with no indexes. Then, indexes can be created. However, indexes may not be necessary because the tables are small and contain data that already is clustered according to anticipated query needs, so the selectivity of a query comes a long way by choosing the optimal set of tables from which to select. During this processing, the loading and summary generation takes place using temporary table names, leaving the real target tables available for use.

After processing is complete, a swap operation is performed and new data is made available for use. For some RDBMS the swap operation may be performed while the target database is in active use without locking problems, thus eliminating any need for downtime in order to refresh data in the target database.

The template expander ensures that summary tables are created when basis tables are created, and that summary tables are refreshed when basis tables are refreshed, thus assuring consistency between summary and basis tables. This eliminates the problem of stale summary data in the target database.

The present disclosure enables reliable repeated cycles of extracting, splitting, and loading. It thus seamlessly propagates the effects of update and delete commands affecting the source dataset to the target database with reduced risk of losing updates and without the need to resort to slower record-by-record processing.

The present disclosure also enables reliable recovery from many errors. The loading operation can be restarted without the need for cleanup because each load operation starts with a fresh and empty table. Leftovers from previously failed operations are discarded.

Using the present disclosure, propagation of updates is resource-effective, thus enabling frequent refresh operations to be performed and thus providing users with fresh data.

A web server application, which utilizes the physical target database schema design, may be provided. The web server application may have means to select the most appropriate tables to query in the target database by having knowledge of the mapping employed for each source dataset. According to the example embodiment described herein, a software developer may design a data mapping to support the query needs of a particular web server application. The web server application will become the users' entry to the data via web browsers or other applications, so that the users will not be exposed to the physical data model.

Another aspect of the present disclosure presents a physical data model comprising small basis tables and summary tables that are made available to frontend web-server applications.

In various embodiments, the present disclosure reduces the probability of encountering the "lost updates problem." This is accomplished by using a source-partitioning scheme that is refreshed based on any update within the source partition. With such a scheme, any change within the partition will trigger a repeat extraction of the whole partition. This repeated extraction will catch eventual lost updates missed on previous extractions.

The present disclosure introduces multiple partitioning schemes for a fact table using splitting templates. The present disclosure may also reduce cost by simplifying the extract-transform-load (ETL) process. The present disclosure reduces and simplifies status information in the staging area and this simplifies error recovery in case of failed operation in the ETL process. The present disclosure eliminates the large fact table of prior art in the data warehouse database but still keeps all of the data.

Such embodiments of the inventive subject matter may be referred to herein individually or collectively by the term "invention" merely for convenience and without intending voluntarily to limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Certain systems, apparatus, applications, or processes described herein may be implemented as a number of subsystems, modules, or mechanisms. A subsystem, module, or mechanism is a unit of distinct functionality that can provide information to, and receive information from, other subsystems, modules, or mechanisms. Further, such a unit may be configurable to process data. Accordingly, subsystems, modules, or mechanisms may be regarded as being communicatively coupled. The subsystems, modules, or mechanisms may be implemented as hardware circuitry, optical components, single or multi-processor circuits, memory circuits, software program modules and objects, firmware, and combinations thereof, as appropriate for particular implementations of various embodiments.

For example, one module may be implemented as multiple logical subsystems, modules, or mechanisms, or several subsystems, modules, or mechanisms may be implemented as a single logical subsystem, module, or mechanism. As another example, subsystems, modules, or mechanisms labeled as "first," "second," "third," and the like, may be implemented in a single subsystem, module, or mechanism, or some combination of subsystems, modules, or mechanisms, as would be understood by one of ordinary skill in the art.

In the foregoing Detailed Description, various features are grouped together in a single embodiment for streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The description includes references to the accompanying drawings, which form a part of the Detailed Description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

As used throughout this application, the word "may" is used in a permissive sense (e.g., meaning having the potential to), rather than the mandatory sense (e.g., meaning must). Similarly, the words "include", "including", and "includes" mean "including but not limited to." To facilitate understanding, like reference numerals have been used, where possible, to designate like elements common to the figures.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," "third," and the like are used merely as labels, and are not intended to impose numerical requirements on their objects.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for improving query performance in a data warehousing environment, the method comprising:
    splitting data as part of an extract-transform-load (ETL) process in a data warehousing environment, the data extracted from a data source and split into:
        a first set of split data portions based on a first attribute of the extracted data, the first set of split data portions configured to be used as a source for a first set of target relvars; and
        a second set of split data portions based on a second attribute of the extracted data, the second set of split data portions configured to be used as a source for a second set of target relvars, the second attribute being different from the first attribute,
        wherein data within each set of relvars is organized according to an inquiry restricted by at least one of the first attribute or the second attribute;
    using the first and second split data portions to refresh corresponding target relvars;
    wherein as a result of the refreshing the first and second set of target relvars, a same portion of the data from the data source is contained within each of the first and second sets of target relvars, and the same portion of data is arranged differently in the first set of target relvars than in the second set of target relvars;
    wherein each of the first and second target relvars are one of a database table or a partition of a database table;
    saving the first and second sets of split data portions for comparison with sets of split data portions created by splitting a later set of extracted data from the data source;
    comparing the first and second split data portions with a previously saved version of the first and second sets of split data portions to identify modified split data portions; and
    propagating the modified split data portions for refreshing the first and second set of target relvars.

2. The method of claim 1, comprising:
    generating the extracted data by selecting data from a tuple source in the data source in accordance with a mapping, wherein the mapping maps data from the data source to the plurality of relvars.

3. The method of claim 1, comprising:
    accessing a plurality of parameters;
    identifying a list of the split data portions to be used for relvar refresh operations;
    for each of the split data portions to be used for relvar refresh operations:
        locating a template associated with the split data portion; and
        generating, using the template and the plurality of parameters, a plurality of instructions for refreshing a target relvar of the first or second set of target relvars using the associated split data portion.

4. The method of claim 3, comprising:
    generating, for at least one of the split data portions to be used for relvar refresh, instructions for generating a dependent summary relvar.

5. The method of claim 4, comprising identifying a template using a name of a split data portion.

6. The method of claim 1, comprising:
    utilising a bulk load procedure to load the first and second sets of split data portions.

7. The method of claim 1, wherein the first and second sets of target relvars are in a database that does not include the data source.

8. The method of claim 1, wherein the same portion of the data from the data source comprises a record from the data source.

9. A method for improving query performance in a data warehousing environment, the method comprising:
    splitting during an extract-transform-load (ETL) process, by a computer system and in accordance with a data mapping, data from a data source into:
        a first set of split data portions based on a first attribute of the data, the first set of split data portions configured to be a source of data for a first set of target relvars; and
        a second set of split data portions based on a second attribute of the data, the second set of split data portions configured to be a source of data for a second set of target relvars;
    using a portion of the first set of split data portions to refresh the first set of target relvars; and
    using a portion of the second set of split data portions to refresh the second set of target relvars;
    wherein as a result of the refreshing the first and second set of target relvars, a same portion of the data from the data source is contained within each of the first and second sets of target relvars, and the same portion of data is arranged differently in the first set of target relvars than in the second set of target relvars; and
    wherein the splitting and using operations are repeatable to accommodate a new extraction of data from the data source to extract new data from the data source, and wherein when repeated, the using operations include updating data within the first and second sets of target relvars to reflect the new data extracted from the data source by:
        comparing the first set of split data portions from the splitting with the first set of split data portions from the repeated splitting to detect modification of data in the first set of split data portions from the repeated splitting; and
        comparing the second set of split data portions from the splitting with the second set of split data portions from the repeated splitting to detect modification of data in the second set of split data portions from the repeated splitting.

10. The method of claim 9, wherein the using further comprises:
    utilizing at least one template to generate instructions for refreshing the first and second sets of target relvars based on the respective first and second split data portions, each of the at least one templates customized for a subset of at least one of the first and second sets of split data portions.

11. The method of claim 9, further comprising automatically generating a name of a target relvar in accordance with the data mapping, the target relvar associated with at least one of the first and second set of target relvars.

12. The method of claim 11, wherein the name of the target relvar reflects how the data is split.

13. The method of claim 11, further comprising using a name of a target relvar as part of a hash function to service an incoming inquiry.

14. The method of claim 11, further comprising:
  matching a restriction element of an incoming inquiry against names of target relvars in the first and second sets of target relvars to locate a target relvar configured to deliver data related to the incoming inquiry; and
  generating a query directed to the located target relvar to produce a result for the incoming inquiry.

\* \* \* \* \*